United States Patent
Ohsawa

(10) Patent No.: US 10,406,435 B2
(45) Date of Patent: Sep. 10, 2019

(54) STORAGE MEDIUM STORING INFORMATION PROCESSING PROGRAM, INFORMATION PROCESSING APPARATUS AND INFORMATION PROCESSING METHOD

(71) Applicant: Nintendo Co., Ltd., Kyoto (JP)

(72) Inventor: Kazuyoshi Ohsawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/136,472

(22) Filed: Sep. 20, 2018

(65) Prior Publication Data

US 2019/0015746 A1 Jan. 17, 2019

Related U.S. Application Data

(63) Continuation of application No. 16/007,462, filed on Jun. 13, 2018, now Pat. No. 10,105,597, which is a (Continued)

(30) Foreign Application Priority Data

May 12, 2008 (JP) ................................. 2008-124807

(51) Int. Cl.
  *G06F 3/0488* (2013.01)
  *A63F 13/44* (2014.01)
  (Continued)

(52) U.S. Cl.
  CPC .............. *A63F 13/44* (2014.09); *A63F 13/10* (2013.01); *A63F 13/2145* (2014.09); (Continued)

(58) Field of Classification Search
  CPC ...... A63F 13/10; A63F 13/426; A63F 13/814; A63F 13/44; A63F 13/2145;
  (Continued)

(56) References Cited

U.S. PATENT DOCUMENTS 6,344,847 B1   2/2002 Nagao
6,492,979 B1  12/2002 Kent et al.
(Continued)

FOREIGN PATENT DOCUMENTS

JP    4-233621    8/1992
JP    7-20985     1/1995
(Continued)

OTHER PUBLICATIONS

Pinky Street Kira Kira Music Night, Gemanga Jan. 2008 issue, Jan. 1, 2008, vol. 25, No. 1, 446th issue, p. 98., published by SB Creative Corp.
(Continued)

*Primary Examiner* — Christopher E Leiby
(74) *Attorney, Agent, or Firm* — Nixon & Vanderhye PC

(57) ABSTRACT

A game apparatus includes two LCDs, and a game screen is displayed on one LCD, and a touch panel is set on the other LCD. A game screen for teaching an input timing and an input kind that are set in advance is displayed, and music for teaching the input timing is output. A player performs a touch-on operation, a touch-off operation, a flipping operation and a rubbing operation on the touch panel by viewing the game screen, and listening to the music. The input timing and input kind that are performed by the player and the input timing and the input kind that are set in advance are compared to thereby produce a situation corresponding to the comparison result.

20 Claims, 17 Drawing Sheets

Related U.S. Application Data continuation of application No. 12/328,279, filed on Dec. 4, 2008, now abandoned.

(51) Int. Cl.
  *A63F 13/426* (2014.01)
  *A63F 13/814* (2014.01)
  *A63F 13/2145* (2014.01)
  *A63F 13/40* (2014.01)

(52) U.S. Cl.
  CPC .......... *A63F 13/426* (2014.09); *A63F 13/814* (2014.09); *G06F 3/0488* (2013.01); *A63F 2300/1075* (2013.01); *A63F 2300/204* (2013.01); *A63F 2300/8047* (2013.01)

(58) Field of Classification Search
  CPC ........ A63F 2300/1075; A63F 2300/204; A63F 2300/8047; G06F 3/0488
  See application file for complete search history.

(56) References Cited

U.S. PATENT DOCUMENTS

| | | | |
|---|---|---|---|
| 6,590,567 | B1 | 7/2003 | Nagao et al. |
| 6,757,002 | B1 | 6/2004 | Oross |
| 2002/0063688 | A1* | 5/2002 | Shaw .................... G06F 3/0312 345/163 |
| 2006/0007174 | A1 | 1/2006 | Shen |
| 2006/0109259 | A1 | 5/2006 | Ohta |
| 2007/0024597 | A1 | 2/2007 | Matsuoka |
| 2007/0247441 | A1 | 10/2007 | Kim |
| 2007/0270220 | A1 | 11/2007 | Kaneshige et al. |
| 2008/0036743 | A1* | 2/2008 | Westerman ............. G06F 3/038 345/173 |
| 2008/0088598 | A1 | 4/2008 | Kogo |
| 2009/0122022 | A1 | 5/2009 | Park |
| 2009/0195511 | A1 | 8/2009 | Cites |
| 2009/0278809 | A1 | 11/2009 | Ohsawa |

FOREIGN PATENT DOCUMENTS

| | | |
|---|---|---|
| JP | 8-305356 | 11/1996 |
| JP | 2001-14101 | 1/2001 |
| JP | 2002-939 | 1/2002 |
| JP | 2002-35411 | 2/2002 |
| JP | 2005-253803 | 9/2005 |
| JP | 2005-319175 | 11/2005 |
| JP | 2006-340744 | 12/2006 |
| JP | 2007-296228 | 11/2007 |
| JP | 2008-17934 | 1/2008 |

OTHER PUBLICATIONS

Japanese Office Action issued in Japanese Patent Application No. 2013-014920 dated Jul. 1, 2014 (w/ translation).

Shichida Shiki Traing Unou Tanren Unotan DS Shunkan Shobu! Kiokuryoku/Shuchuryoku/Handanryoku, DS Kageyama Method Tadasi Kanji Kakitori Kun. Toeic Test DS Training, Anpanman to Asobo Aiueo Kyoshitsu: Complete Edition, 07 Summer DS Soft All Catalogue, No. 12, Published by Mainichi Communications, Aug. 1, 2007, p. 123, with English Translation.

Meccha! Taiko no Tatsujin DS: 7tsu no Shima no Daibouken, Dengeki Nitendo DS, vol. 8, No. 9, Japan, ASCII Media Works, on the market on Apr. 24, 2008, pp. 152-155.

U.S. Appl. No. 16/007,462, filed Jun. 13, 2018, Ohsawa.

\* cited by examiner

FIG. 4
(A) GAME SCREEN 100
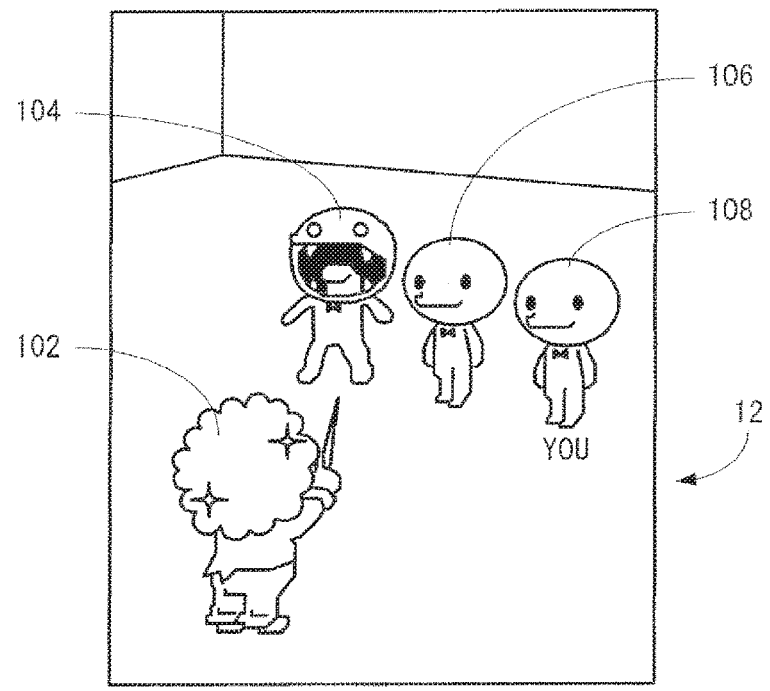
(B) GAME SCREEN 100
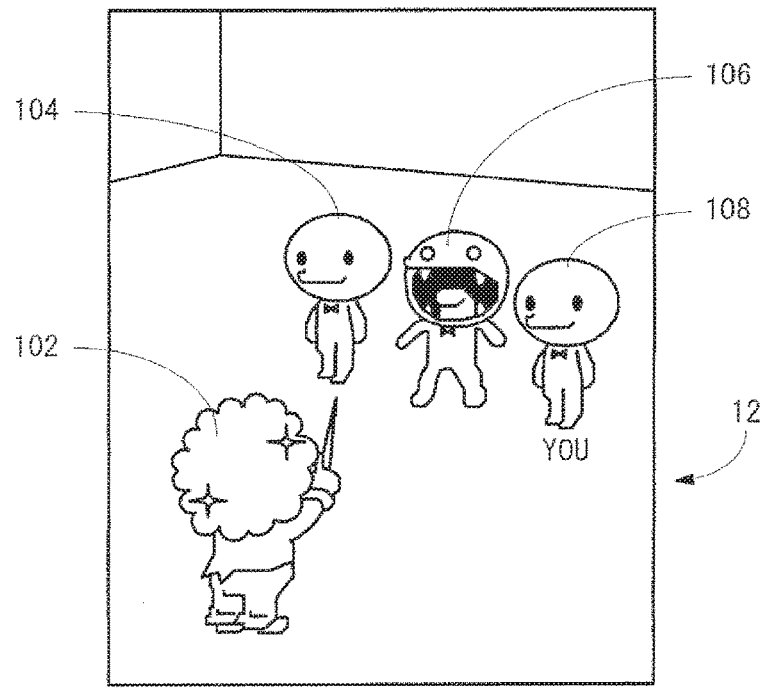

DATA MEMORY AREA 74 — 740

| INPUT BUFFER | 742 |
| IMAGE DATA | 744 |
| SOUND DATA | 746 |
| SETTING INPUT TABLE DATA | 748 |
| CHECKING ZONE DATA | 750 |
| CURRENT TIMING DATA | 752 |
| CURRENT TICK COUNT DATA | 754 |
| CURRENTLY-TOUCHED POSITION DATA | 756 |
| PREVIOUSLY-TOUCHED POSITION DATA | 758 |
| MOVEMENT AMOUNT DATA | 760 |
| TIMING COUNTER | 762 |
| TOUCH FLAG | 764 |
| RUB DETECTING FLAG | |

(B) SETTING INPUT TABLE

| ID | INPUT TIMING (THE NUMBER OF TICKS) | INPUT KIND (KIND OF ACTION) |
|---|---|---|
| 1 | 480 | TOUCH ON |
| 2 | 960 | TOUCH OFF |
| ⋮ | ⋮ | ⋮ |

STORAGE MEDIUM STORING INFORMATION PROCESSING PROGRAM, INFORMATION PROCESSING APPARATUS AND INFORMATION PROCESSING METHOD

CROSS REFERENCE OF RELATED APPLICATION

This application is a continuation of application Ser. No. 16/007,462 filed Jun. 13, 2018, which is a continuation of application Ser. No. 12/328,279 filed Dec. 4, 2008, which claims priority to Japanese Patent Application No. 2008-124807 filed May 12, 2008, the entire contents of each of which are hereby incorporated by reference in this application.

BACKGROUND AND SUMMARY

The technology presented herein relates to a storage medium storing an information processing program, an information processing apparatus, and an information processing method. More specifically, the present technology relates to a storage medium storing an information processing program, an information processing apparatus, and information processing method which uses a pointing device like a touch panel.

One example of the related art is disclosed in Japanese Patent Application Laid-Open No. 2006-340744 [A63F 13/00, A63F 13/12] laid-open on Dec. 21, 2006. According to this related art, a marker image is displayed on a game screen to the playing of music so as to be changed in position, and a timer circle image representing a touch timing of the marker image is displayed. A player weighs a timing by listening to the playing of the music and viewing the timer circle image, and touches the marker image to be touched. The success or failure of the touch is evaluated on the basis of the timing and position of the touch, and if the evaluation of the touch fails, a game screen is shaken.

However, in this related art, the evaluation of the touch (touch-on operation) is merely performed, and there is a limit to input patterns required for the user, so that even if the marker image to be touched is variably displayed on the game screen, the input is apt to be monotonous.

Therefore, it is a primary feature of an example embodiment presented herein to provide a novel storage medium storing an information processing program, information processing apparatus and information processing method.

Furthermore, another feature of the present embodiment is to provide a storage medium storing an information processing program, an information processing apparatus and an information processing method capable of improving operability by increasing the variety of an input.

The present embodiment employs following features in order to solve the above-described problems. It should be noted that reference numerals and the supplements inside the parentheses show one example of a corresponding relationship with the embodiments described later for easy understanding of the present embodiment, and do not limit the present embodiment.

A first embodiment is a storage medium storing an information processing program, and the information processing program causes a computer of an information processing apparatus capable of receiving an input from a pointing device to execute an instructed coordinate storing step, an input deciding step, an input comparing step, and a process executing step. The instructed coordinate storing step stores instructed coordinates instructed by the pointing device in a storing means. The input deciding step decides an input timing and an input kind on the basis of the instructed coordinates stored in the instructed coordinate storing step. The input comparing step compares an input timing and an input kind that are set in advance and the input timing and the input kind that are decided by the input deciding step. The process executing step executes predetermined processing depending on the comparison result by the input comparing step.

In the first embodiment, an information processing program stored in the storage medium is executed by a computer (34, 44, 46) of an information processing apparatus (10) capable of receiving an input from a pointing device (24). The information processing program causes the computer to execute an instructed coordinate storing step (34, S121), an input deciding step (34, S129, S131), an input comparing step (34, S85, S87), and a process executing step (34, S89, S93, S95). The instructed coordinate storing step stores the instructed coordinates instructed by the pointing device in a storing means (42, 74). The input deciding step decides an input timing and an input kind on the basis of the instructed coordinates stored in the instructed coordinate storing step. That is, the input timing by the user or the player is decided, and the input kind is identified. The input comparing step compares an input timing and an input kind that are set in advance and the input timing and the input kind that are decided by the input deciding step. That is, it is determined whether or not the input is performed at a correct timing and a correct kind. Then, the process executing step executes predetermined processing according to the comparison result by the input comparing step. For example, if a correct input is performed at a correct timing, predetermined processing indicating that the input is successful is executed. Furthermore, if the input is performed at a correct timing, but different in the input kind, or if the input is performed at an incorrect timing, predetermined processing indicating that the input is unsuccessful is executed.

According to the first embodiment, the input kind is also decided on the basis of the instructed coordinates as well as the input timing, and therefore, it is possible to perform a variety of inputs and prevent the input operation from being monotonous.

In a second embodiment, a touch panel is used as a pointing device.

According to the second embodiment, the use of the touch panel allows the user or the player to easily perform various kinds of operations, such as a touch-on operation, a touch-off operation, a sliding (dragging) operation, etc. with a touch pen (stylus pen), a finger, or the like.

In a third embodiment the input kind includes at least an input determined depending on a situation when a shift of a state as to whether or not the touch panel is touched occurs.

In the third embodiment, the input kind includes at least an input determined depending on a situation when a shift of the state as to whether or not the touch panel is touched occurs, that is, a situation in which a touch-on state shifts to a touch-off state or a situation in which the touch-off state shifts to the touch-on state.

In the third embodiment, the input kind is determined at a time when a touch state shifts and in correspondence with the state, and therefore, various kinds of input can be determined. That is, it is possible to perform various inputs.

In a fourth embodiment the input timing decided by the input deciding step includes at least a timing when the shift of the state as to whether or not the touch panel is touched occurs.

In the fourth embodiment, the input timing decided by the input deciding step includes at least a timing when the shift of the state as to whether or not the touch panel is touched occurs, that is, a timing when the touch-on state shifts to the touch-off state and a timing when the touch-off state shifts to the touch-on state.

According to the fourth embodiment, the timing when the shift of the state as to whether or not the touch panel is touched occurs is decided as an input timing, and therefore, it is possible to easily detect an input timing.

In a fifth embodiment the information processing program further causes the computer to execute a touch-on judging step for judging that a state in which the touch panel is not touched shifts to a state in which the touch panel is touched, and a touch-off judging step for judging that the state in which the touch panel is touched to the state in which the touch panel is not touched, and the input deciding step decides that the input kind is a first kind in a case the touch-on judging step judges that the shift is made, and decides the input kind is a second kind in a case that the touch-off judging step judges that the shift is made.

In the fifth embodiment, the touch-on judging step (34, S127, S141) judges that a state in which the touch panel is not touched (touch-off state) shifts to a state in which the touch panel is touched (touch-on state). The touch-off judging step (34, S127, S171) judges that the state in which the touch panel is touched (touch-on state) to the state in which the touch panel is not touched (touch-off state). The input deciding step decides that the input kind is the first kind when the touch-on judging step judges that the shift is made ("YES" in S127 and "NO" in S141). Furthermore, the input deciding step decides that the input kind is the second kind in a case that the touch-off judging step determines that the shift is made ("NO" in the S127 and "YES" in the S171).

In the fifth embodiment, the input kind is decided depending on the shift between the touch-on state to the touch-off state, and therefore, it is possible to easily decide (determine) the kinds of the input.

In a sixth embodiment the input timing decided by the input deciding step is a timing when the touch-on judging step judges that the shift is made in a case that the input kind is the first kind, and is a timing when the touch-off judging step judges that the shift is made in a case that the input kind is the second kind.

In the sixth embodiment, the input timing is decided depending on the input kind by the input deciding step. For example, in a case that the input kind is the first kind, it is the timing when the touch-on judging step judges that the shift is made. That is, it is the timing when it is determined the touch-off state shifts to the touch-on state. Alternatively, in a case that the input kind is the second kind, it is the timing when the touch-off judging step judges that the shift is made. That is, it is the timing when it is determined the touch-on state shifts to the touch-off state.

According to the sixth embodiment, the timing when it is determined that the touch state is shifted is made an input timing, which makes it easy to determine the timing.

A seventh embodiment is a storage medium storing an information processing program, wherein the information processing program causes the computer to execute a movement amount calculating step for calculating a movement amount on the touch panel immediately before the touch-off judging step judges that the shift is made on the basis of the instructed coordinates stored by the instructed coordinate storing step when the touch-off judging step judges that the shift is made, and the input deciding step decides that the input kind is the second kind in a case that the movement amount calculated by the movement amount calculating step is equal to or less than a predetermined value, and decides that the input kind is the third kind in a case that the movement amount calculated by the movement amount calculating step is above the predetermined value.

In the seventh embodiment, a movement amount calculating step (34, S123, S125, S172) calculates a movement amount on the touch panel immediately before the touch-off judging step judges that the shift is made on the basis of the instructed coordinates stored by the instructed coordinate storing step when the touch-off judging step judges that the shift is made. For example, the distance between the instructed coordinates temporally continuously detected is calculated. An input deciding step decides that the input kind is the second kind in a case that the movement amount is equal to or less than a predetermined value, and decides that the input kind is the third kind in a case that the movement amount is above the predetermined value.

According to the seventh embodiment, the movement amount immediately before it is determined that the touch-on state shifts to the touch-off state is calculated, and the input kind is decided (determined) in correspondence with the instructed coordinates when a touch-off operation is performed and the amount of the movement that is immediately before made, and therefore, it is possible to increase the variety of the inputs.

In an eighth embodiment the input timing decided by the input deciding step is a timing when the touch-on judging step judges that the shift is made in a case that the input kind is the first kind, and a timing when the touch-off judging step judges that the shift is made in a case that the input kind is the second kind and the third kind.

In the eighth embodiment, the input timing is decided by the input deciding step depending on the input kind. For example, in a case that the input kind is the first kind, the timing is a timing when the touch-on judging step judges that the shift is made. Furthermore, in a case that the input kind is the second kind and the third kind, the timing is a timing when the touch-off judging step judges that the shift is made.

According to the eighth embodiment, the timing about which the touch state is determined to be shifted is made an input timing, which makes it easy to determine the timing.

In a ninth embodiment the information processing program causes the computer to further execute a touch-off judging step for judging that the state in which the touch panel is touched shifts to the state in which the touch panel is not touched and a movement amount calculating step for calculating a movement amount on the touch panel immediately before the touch-off judging step judges that the shift is made on the basis of the instructed coordinates stored by the instructed coordinate storing step when the touch-off judging step judges that the shift is made, and the input deciding step decides that the input kind is the first kind in a case that the movement amount calculated by the movement amount calculating step is equal to or less than a predetermined value, and decides that the input kind is the second kind in a case that the movement amount calculated by the movement amount calculating step is above the predetermined value.

In the ninth embodiment, a touch-off judging step (34, S127, S171) judges that the state in which the touch panel is touched (touch-on state) shifts to the state in which the touch panel is not touched (touch-off state). A movement amount calculating step (34, S123, S125, S172) calculates a movement amount on the touch panel immediately before the touch-off judging step judges that the shift is made on the basis of the instructed coordinates stored by the instructed coordinate storing step when the touch-off judging step judges that the shift is made. For example, the distance between the instructed coordinates temporally continuously detected is calculated. The input deciding step decides that the input kind is the first kind in a case that the movement amount calculated by the movement amount calculating step is equal to or less than a predetermined value ("YES" in S173), and decides that the input kind is the second kind in a case that the movement amount calculated by the movement amount calculating step is above the predetermined value ("NO" in S173).

According to the ninth embodiment, the input kind is decided (determined) depending on the amount of movement immediately before the touch-off operation is performed, and therefore, it is possible to increase the variation of the inputs.

In a tenth embodiment the input timing decided by the input deciding step is a timing when the touch-off judging step judges that the shift is made with respect to the first kind and the second kind.

In the tenth embodiment, the input timing is decided, by the input deciding step, to be the timing when the touch-off judging step judges that the shift is made in a case that the input kind is the first kind and the second kind.

According to the tenth embodiment, the timing when it is determined that the touch state is shifted is made an input timing, which makes it easy to determine the timing.

In an eleventh embodiment the computer executes the input comparing step and the process executing step in a first task, executes the instructed coordinate storing step and the input deciding step in a second task different from the first task, and a processing cycle of the second task is set to be shorter than a processing cycle of the first task.

In the eleventh embodiment, the computer executes the input comparing step and the process executing step in a first task. Furthermore, the computer executes the instructed coordinate storing step and the input deciding step in a second task different from the first task. The first task is executed at processing cycle of one frame (screen updating rate), for example, and the second task is executed at the processing cycle shorter than one frame.

According to the eleventh embodiment, the processing cycle of the second task is made shorter than the processing cycle of the first task, and therefore, it is possible to reduce omission of fetching the input by the user.

In a twelfth embodiment the information processing program causes the computer to further execute an input buffer storing step for storing the input timing and the input kind that are decided by the input deciding step in the storing means and an input buffer erasing step for erasing the input timing and the input kind that are stored in the storing means after the input comparing step and the process executing step are executed, and the input comparing step and the process executing step make all the input timings and all the input kinds that are stored in the storing means objects to be processed.

In the twelfth embodiment, the information processing program causes a computer to further execute an input buffer storing step (34, S149, S157, S175, S177) and an input buffer erasing step (34, S99). The input buffer step stores the input timing and the input kind that are decided by the input deciding step in the storing means. The input erasing step erases the input timing and the input kind that are stored in the storing means after the input comparing step and the process executing step are executed. The input comparing step and the process executing step make all the input timings and all the input kinds that are stored in the storing means objects to be processed (S83, S97).

According to the twelfth embodiment, all the input timings and all the input kinds that are stored in the storing means are made objects to be processed, and therefore, it is possible to surely process the input by the user.

In a thirteenth embodiment the process executing step includes an evaluating step for evaluating the input depending on the comparison result by the input comparing step, and executes the predetermined processing depending on the evaluation by the evaluating step.

In the thirteenth embodiment of the information processing program, the process executing step (34, S89, S93, S95) includes an evaluating step for evaluating the input depending on the comparison result by the input comparing step (34, S85, S87, S93), and executes the predetermined processing depending on the evaluation.

According to the thirteenth embodiment, processing depending on the evaluation is executed, and therefore, it is possible for the user to know the evaluation about the input by the processing.

In a fourteenth embodiment the input comparing step includes a degree of coincidence detecting step for detecting a degree of coincidence between the input timing and the input kind that are set in advance and the input timing and the input kind that are decided by the input deciding step, and the process executing step executes the predetermined processing depending on the degree of coincidence detected by the degree of coincidence detecting step.

In the fourteenth embodiment, a degree of coincidence detecting step (34, S85, S87) detects a degree of coincidence between the input timing and the input kind that are set in advance and the input timing and the input kind that are decided by the input deciding step. That is, it is determined whether or not a correct kind of input is performed at a correct input timing. The degree of coincidence is a time lag of the input timing, for example. The process executing step executes the predetermined processing depending on the degree of coincidence.

According to the fourteenth embodiment, the processing according to the degree of coincidence of the input is executed, and therefore, the user or the player can know the correctness of the input of his or her own.

In a fifteenth embodiment the process executing step includes an evaluating step for evaluating the input depending on the result compared by the input comparing step, and executes the predetermined processing depending on the evaluation by the evaluating step.

In the fifteenth embodiment, the process executing step includes an evaluating step (34, S85, S87, S93) for evaluating the input depending on the result compared by the input comparing step, and executes the predetermined processing depending on the evaluation.

According to the fifteenth embodiment, processing depending on the evaluation is executed, and therefore, it is possible for the user to know the evaluation about the input by the processing.

In a sixteenth embodiment as the degree of coincidence detected by the degree of coincidence detecting step is high, the evaluating step makes a high evaluation.

In the sixteenth embodiment, as the degree of coincidence is high, the evaluating step makes a high evaluation. Thus, the predetermined processing is executed such that the content is different depending on the evaluation.

According to the sixteenth embodiment, processing depending on the evaluation is executed, and therefore, it is possible for the user to know the evaluation about the input by the processing.

In a seventeenth embodiment the information processing program causes the computer to further execute a teaching step for teaching the input timing and the input kind that are set in advance, and the input comparing step compares the input timing and the input kind that are taught by the teaching step and the input timing and the input kind that are decided by the input deciding step.

In the seventeenth embodiment, a teaching step (34, S3) teaches the input timing and the input kind that are set in advance. Accordingly, the input comparing step compares the input timing and the input kind that are taught by the teaching step and the input timing and the input kind that are decided by the input deciding step.

According to the seventeenth embodiment, the input timing and the input kind that are set in advance are taught to the user or the player, which allows the user or the player to weigh a timing and to perform a correct input, capable of providing a high operability.

In an eighteenth embodiment the teaching step teaches the input timing and the input kind that are set in advance by outputting at least one of music and an image.

In the eighteenth embodiment, the teaching step can teach the user or the player the timing by playing music in timed relation to the input timing set in advance, or outputting (displaying) an image in timed relation to the input timing and input kind that are set in advance.

According to the eighteenth embodiment, the input timing and the input kind are taught by means of music and videos, which allows an easy operation.

A nineteenth embodiment is an information processing apparatus capable of receiving an input from a pointing device, and comprises an instructed coordinate storing means, an input deciding means, an input comparing means, and a process executing means. The instructed coordinate storing means stores instructed coordinates instructed by the pointing device in a storing means. The input deciding means decides an input timing and an input kind on the basis of the instructed coordinates stored in the instructed coordinate storing means. The input comparing means compares an input timing and an input kind that are set in advance and the input timing and the input kind that are decided by the input deciding means. The process executing means executes predetermined processing depending on the comparison result by the input comparing means.

In the nineteenth embodiment, the input kind is also decided on the basis of the instructed coordinates as well as the input timing, and therefore, it is possible to perform a variety of inputs and prevent the input operation from being monotonous.

A twentieth embodiment is an information processing method of an information processing apparatus capable of receiving an input from a pointing device, and includes a step of: (a) storing instructed coordinates instructed by the pointing device in a storing means; (b) deciding the input timing and the input kind on the basis of the instructed coordinates stored by the step (a); (c) comparing an input timing and an input kind that are set in advance and the input timing and the input kind that are decided by the step (b); and (d) executing predetermined processing depending on the comparison result by the step (c).

According to the twentieth embodiment, similar to the first embodiment, the input kind is also decided on the basis of the instructed coordinates as well as the input timing, and therefore, it is possible to perform a variety of inputs and prevent the input operation from being monotonous.

The above described, features, aspects and advantages of the present embodiment will become more apparent from the following detailed description of the present embodiment when taken in conjunction with the accompanying drawings.

BRIEF DESCRIPTION OF THE DRAWINGS

FIG. 4 is an illustrative view showing an example of a game screen of a certain virtual game displayed on the game apparatus shown in FIG. 3;

FIG. 10 is an illustrative view showing a detailed content of the data memory area shown in FIG. 9 and contents of a setting input table;

DETAILED DESCRIPTION OF THE PREFERRED EMBODIMENTS

Figure 1:
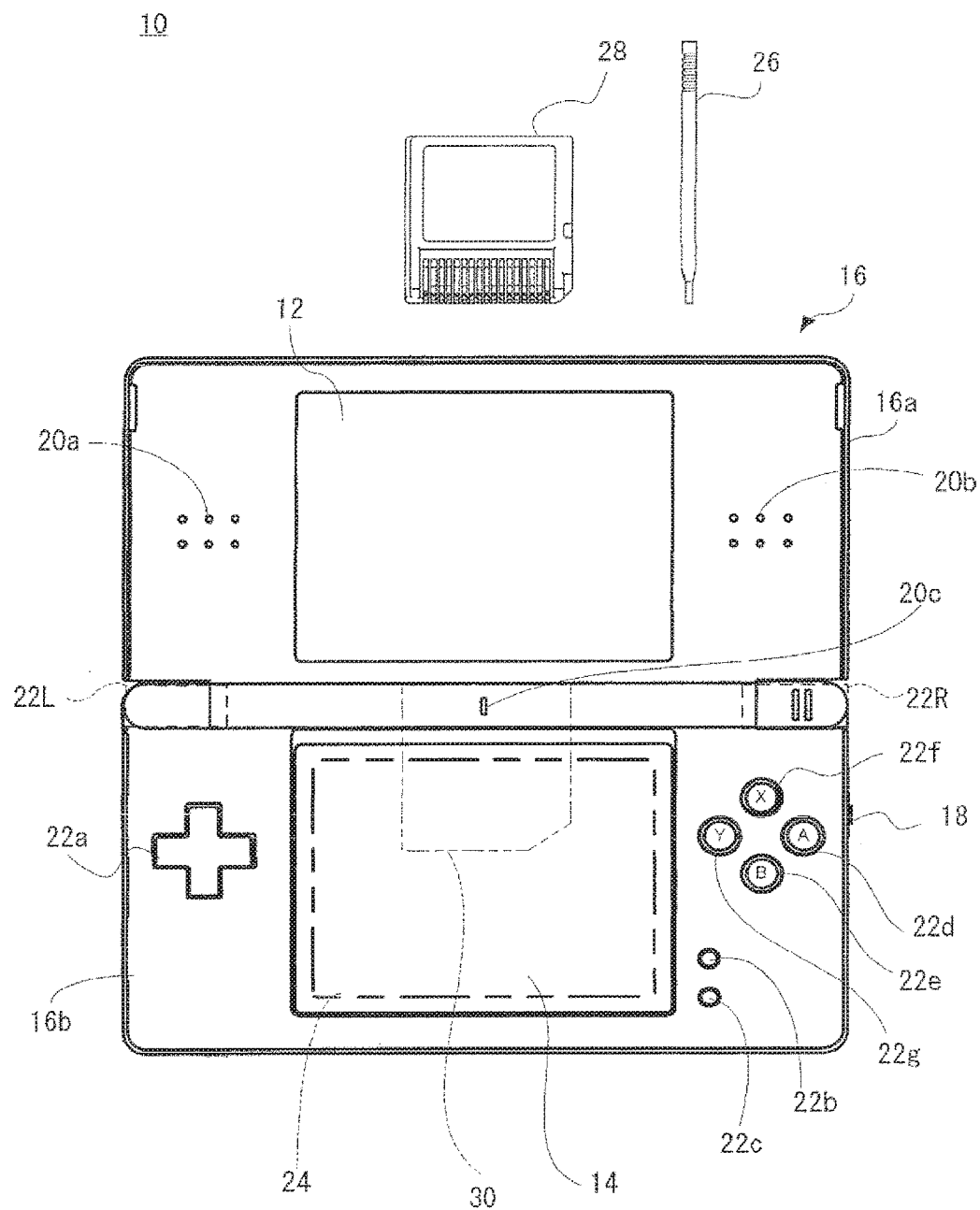
FIG. 1 is an illustrative view showing one embodiment of a game apparatus of the present embodiment.

Referring to FIG. 1, a game apparatus 10 of an embodiment presented herein also functions as an image processing apparatus by storing an image processing program as described later. The game apparatus 10 includes a first liquid crystal display (LCD)12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is set on the upper housing 16a while the LCD 14 is set on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape being approximately the same as the upper housing 16a, and has an opening formed so as to expose a display surface of the LCD 14 at an approximately center of the horizontal direction. On the left side of the LCD 14 of the lower housing 16b, a power switch 18 is provided.

Figure 2:
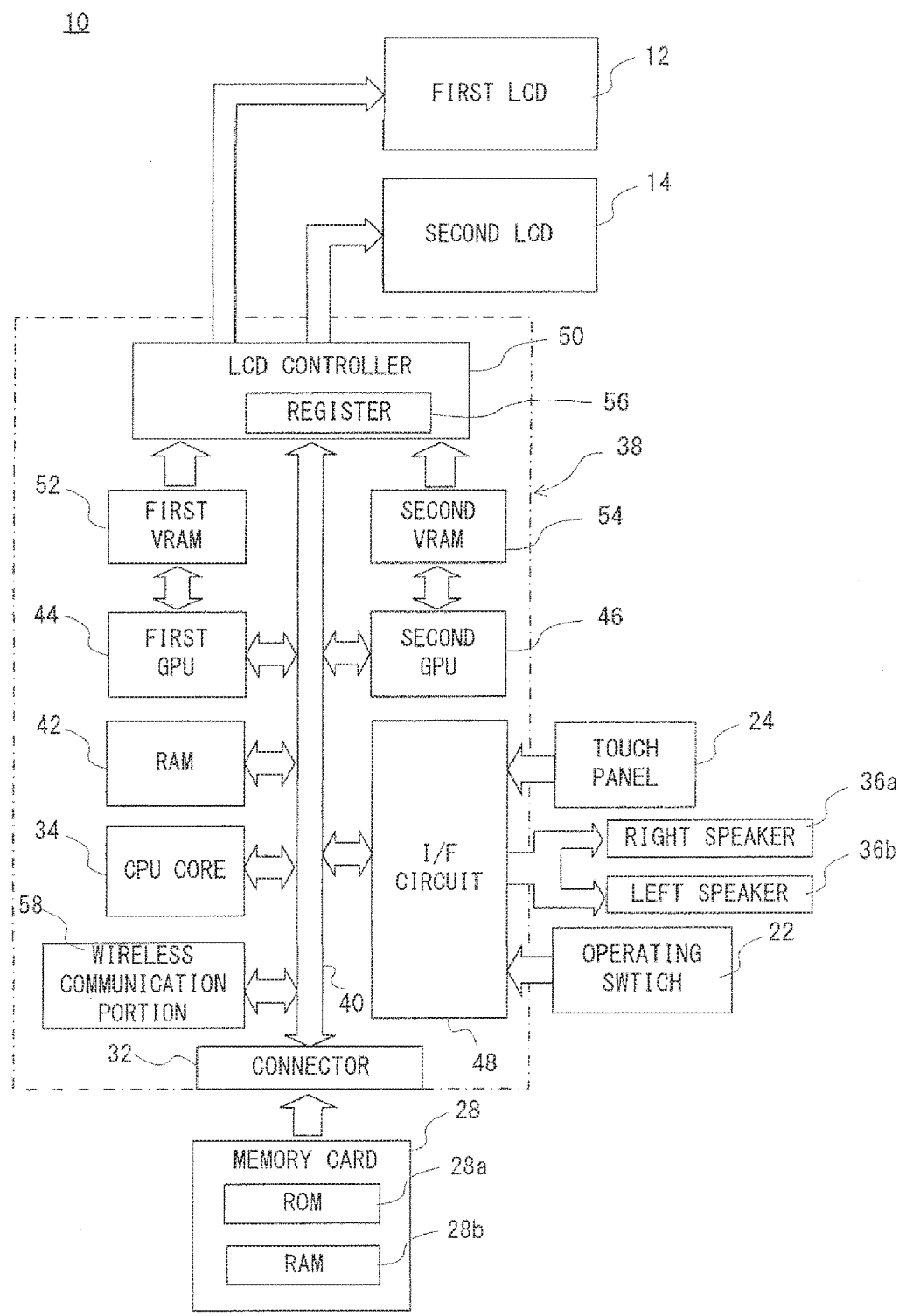
FIG. 2 is a block diagram showing an electric configuration of the game apparatus shown in FIG. 1.

Furthermore, the upper housing 16a is provided with sound release holes 20a and 20b on both sides of the LCD 12 for speakers 36a and 36b (FIG. 2). The lower housing 16b is provided with a microphone hole 20c for a microphone (not illustrated) and operating switches 22 (22a, 22b, 22c, 22d, 22e, 22f, 22g, 22L and 22R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the switch 22L and the switch 22R are arranged at the right and left corners sandwiching the connected portion with the upper housing 16a on the upper side surface of the lower housing 16b.

The direction instructing switch 22a functions as a digital joystick, and is utilized for instructing a moving direction of a player character (or player object) to be operated by a user or a player and for instructing a moving direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push button, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch operation) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots.times.192 dots, and a detection accuracy of the touch panel 24 is also rendered 256 dots.times.192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Additionally, a game play screen may be displayed on the one LCD (LCD 14 in this embodiment), and a game screen including information relating to the game (score, level, etc.) can be displayed on the other LCD (LCD 12 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the three-dimensional game space, and instruct a scrolling (gradual moving display) direction of the game screen (map).

It should be noted that depending on the kind of the game, other input instructions can be made with the use of the touch panel 24. For example, it is possible to input a coordinates input instruction, and manually input texts, numbers, symbols, etc. on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (not illustrated) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a rear surface or a lower edge (bottom surface) of the lower housing 16b. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other to make the memory card 28 accessible by a CPU core 34 (see FIG. 2) of the game apparatus 10.

It should be noted that although not illustrated in FIG. 1, the speakers 36a and 36b (see FIG. 2) are provided at a position corresponding to the sound release holes 20a and 20b inside the upper housing 16a.

Furthermore although omitted in FIG. 1, for example, a battery accommodating box is provided on a rear surface of the lower housing 16b, and a volume switch, an external expansion connector, an earphone jack, etc. are provided on a bottom surface of the lower housing 16b.

FIG. 2 is a block diagram showing an electrical configuration of the game apparatus 10. Referring to FIG. 2, the game apparatus 10 includes an electronic circuit board 38, and on the electronic circuit board 38, a circuit component such as the CPU core 34, etc. is mounted. The CPU core 34 is connected to the above-described connectors 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc.

The RAM 42 is utilized as a buffer memory or a working memory. That is, the CPU core 34 loads the game program, the image data, the sound data, etc. stored in the ROM 28a of the memory card 28 into the RAM 42, and executes the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 44 and the GPU 46 forms a part of a rendering means, is constructed by, for example, a single chip ASIC, and receives a graphics command (rendering command) from the CPU core 34 to generate image data according to the graphics command. Additionally, the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the CPU 46 is connected with a second VRAM 54. The GPU 44 and the GPU 46 respectively access the first VRAM 52 and the second VRAM 54 to obtain data (image data: polygon data, texture data, etc.) required to execute the rendering command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". Additionally, the LCD controller 50 outputs the image data created by the GPU 44 to the LCD 14, and outputs the image data created by the GPU 46 to the LCD 12 in a case that the data value of the register 56 is "1".

Here, the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a, 36b. Here, the operating switch 22 is the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game, such as a game music (BGM), a sound effect or voices of a game character (onomatopoeic sound), etc., and outputs the same from the speakers 36a, 36b via the I/F circuit 48.

Figure 3:
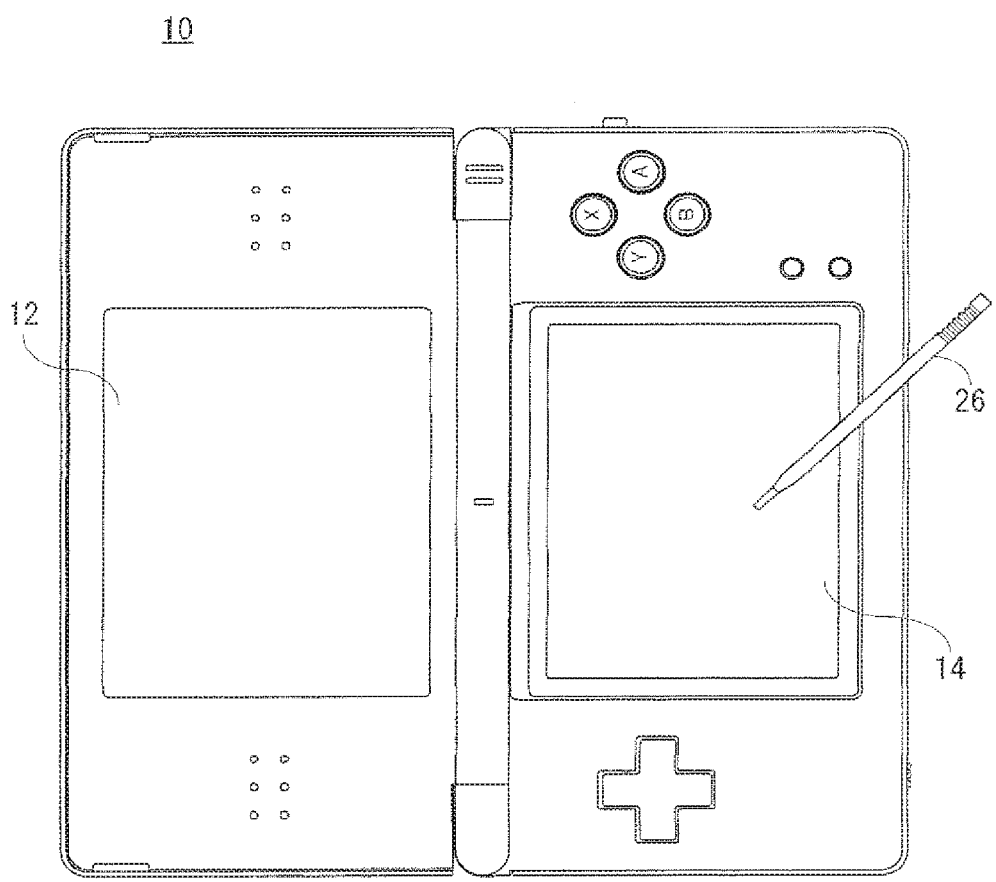
FIG. 3 is an illustrative view showing a usage state when a game is played by utilizing the game apparatus shown in FIG. 1.

FIG. 3 is an illustrative view showing a usage example of the game apparatus 10 shown in FIG. 1 when a virtual game in this embodiment is played. As understood from FIG. 3, in this embodiment, the game apparatus 10 is used in a state it is turned from the state shown in FIG. 1 counterclockwise (to the left) at 90 degrees. Accordingly, the LCD 12 and the LCD 14 (touch panel 24) are arranged side by side. On the LCD 12, a game screen as described later is displayed, and on the LCD 14, a menu screen is displayed. The game screen to be taught on the LCD 12 displays an image (video) for instructing an input timing (set input timing) and an input kind (set input kind) that are set in advance, and an image (video) according to an input by the playing. The touch panel 24 mounted on the top surface of the LCD 14 is utilized as an input device for performing an input on the image (video) displayed on the LCD 12. Furthermore, the menu screen displayed on the LCD 14 is mainly for selecting a game to be played, and during the game, no image (video) is displayed on the LCD 14 while an abstract graphics is displayed on the LCD 12. Here, in another embodiment, any image (video) may be displayed on the LCD 14, and an image (video) in association with the image (video) for teaching the input timing (set input timing) and input kind (set input kind) that are set in advance to be displayed on the LCD 12 may be displayed, for example.

Figure 5:
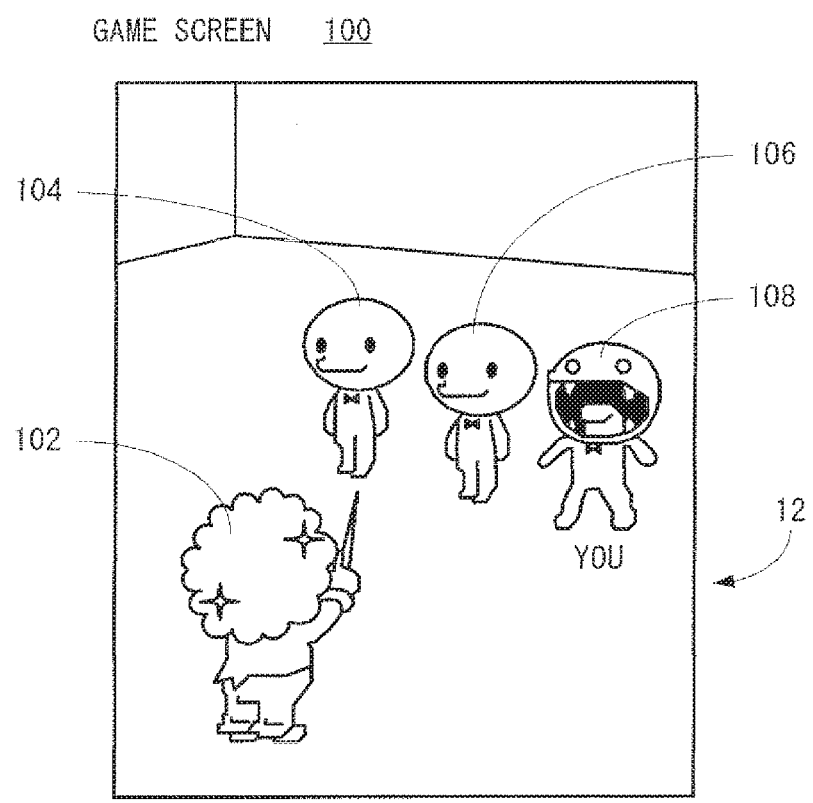
FIG. 5 is an illustrative view showing another example of a game screen of the certain virtual game displayed on the game apparatus shown in FIG. 3.

Each of FIG. 4(A), FIG. 4(B) and FIG. 5 shows an example of a game screen 100 to be displayed on the LCD 12 when the virtual game of this embodiment is played. On the game screen 100, non player objects 102, 104, 106 and a player object 108 are displayed. The non player object 102 is a conductor object, and the non player objects 104, 106 are two of the three objects which sing in chorus. Then, the player object 108 is one of three objects which sing in chorus.

In the virtual game shown in FIGS. 4(A), (B) and FIG. 5, the non player objects 104, 106 and the player object 108 produce sounds according to the performance in this order, for example. The player weighs the timing of producing a sound, and confirms the kind and length of a sound (voice) to be produced on the basis of the played music and the voice production of the non player objects 104, 106. Here, the played music and the sound (voice) produced by the non player objects 104, 106 are taught (presented) by being output from the speakers 20a, 20b.

The player perceives an input timing, an input kind (method) and a length of the input by viewing the game screen 100, listening to the music, listening to the voice production by the non player objects 104, 106, and the like, and makes an input operation. Here, when the touch panel 24 is turned on (touched on) with the stick 26, etc., the player object 108 does not produce a sound (stop producing a sound). That is, when a state that the player touches on the touch panel 24 continues, a state that the player object 108 does not produce a sound also continues.

On the other hand, when the player turns off (touches off) the touch panel 24 with the stick 26, etc., the player object 108 produces a sound. At this time, the produced sound is decided in correspondence with an input history of the player from the touch-on operation to the touch-off operation.

Here, a sound (voice) to be produced by the player is decided according to the difference (amount of the movement) between the instructed coordinates currently detected (instructed coordinates immediately before touching off) and the instructed coordinates previously detected. If the difference is less than a predetermined value, it is determined that a touch-off operation is merely made, and a first voice ("A" for example) is output. On the other hand, if the difference is equal to or more than the predetermined value, it is determined that a flipping operation (hereinafter referred to as "flipping operation") is performed on the touch panel 24 with the stick 26, or the like, and a second voice (for example, "Gya") different from the first voice is output.

Furthermore, when a touch-off state by the player is continued, a voice which is being produced also continues to be output accordingly. That is, the first voice or the second voice is output by a long sound. In order to stop the voice, the player touches on the touch panel 24 again as described above. That is, the player has to weigh the timing of the length of the produced sound.

In this embodiment, other than the touch-on operation, the touch-off operation and the flipping operation, a rubbing operation is also possible, but in the virtual game shown in FIGS. 4(A), (B) and FIG. 5, even if a rubbing operation is performed, the player object 108 does not produce a sound. Here, the rubbing operation means one sliding operation corresponding to going and returning when a sliding operation is made with the stick 26, or the like on the touch panel 24 in a state that the touch panel 24 is touched on with the stick 26, or the like (without being touched off).

Although illustration is omitted, in a case that no input is performed, in a case that a timing of starting to produce a sound is drastically off irrespective of performing an input, in a case that a timing of stopping (ending) producing a sound is drastically off irrespective of performing an input, or in a case that a voice to be produced fails, failure processing is executed. For example, when the failure processing is executed in a case shown in FIGS. 4(A), (B) and FIG. 5, a situation in which the non player objects 104, 106 give the player object 108 a glare is displayed on the game screen 100. Furthermore, in a case that a timing of starting to produce a sound is drastically off, an off-key sound is further output. For example, the off-key sound is a sound (a tone being higher or lower in pitch by a quarter tone from a correct sound) which cannot be played by a keyboard, and dissonance.

In this embodiment, determination whether each of the timing of starting to produce a sound (touching of and the timing of finishing to produce a sound (touching on) are successful (precise, slightly off) or failure (drastically off) is made with reference to the number of ticks of MIDI data corresponding to the music to be played. For example, as described later, a table (setting input table) in which an input kind (touch-on operation, touch-off operation, flipping operation, rubbing operation) to be executed in correspondence with a timing at when the player makes an input (the number of ticks) is described is prepared (see FIG. 10(B)). According to the setting input table, whether or not an input is successful or unsuccessful is determined (evaluated), but if an input is successful is determined only when an input is made at a precisely coincident timing with that described in the setting input table, it is eventually determined in most cases that the input is failure.

Thus, in this embodiment, a certain constant range is provided to determine whether or not an input is successful or unsuccessful. More specifically, the number of ticks from the start of the playing is calculated on the basis of the current number of frames, and when the current number of ticks falls in a zone (checking zone) for determining success or failure of an input, it is determined whether or not the set input kind described in the table and the input kind (actual input kind) of the input buffer are coincident with each other.

Figure 6:
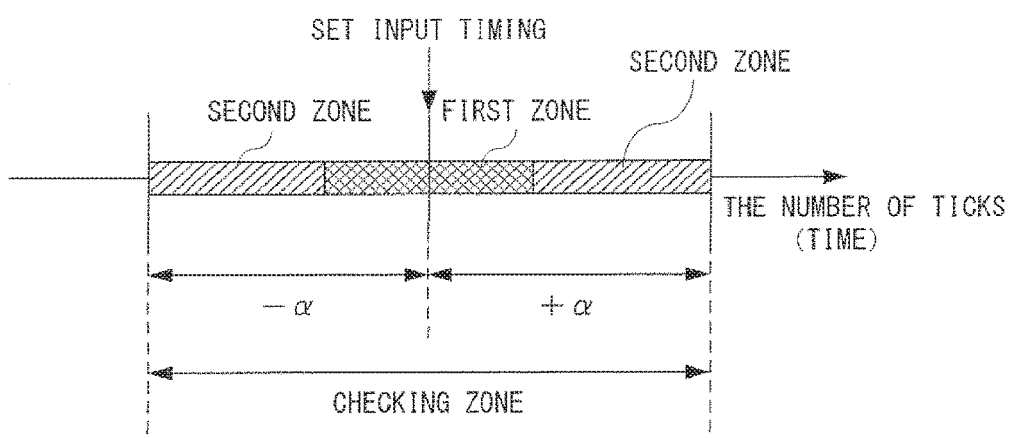
FIG. 6 is an illustrative view far explaining a checking zone to check an actual input timing by a player.

For example, as shown in FIG. 6, the checking zone is defined by setting a certain number of ticks (+.alpha., −.alpha.) before and after the number of ticks of the set input timing. In a case that there is an input by the player during the checking zone, and the actual input kind is coincident with the set input kind, it is determined that the input is successful. However, in a case that there is no input by the player, or in a case that there is an input by the player during the checking zone but the actual input kind is not coincident with the set input kind, it is determined that the input is unsuccessful.

Furthermore, the checking zone is divided into two kinds of sections. One zone (first zone) crosshatched in FIG. 6 includes the set input timing, and is provided in the middle of the checking zone (center, for example). Furthermore, other two zones (second zone) hatched in FIG. 6 are provided at both ends of the first zone except for the first zone within the checking zone.

Accordingly, in a case that the player performs an input in the first zone out of the checking zone, and the input kind (actual input kind) is the same as the input kind (set input kind) described in the setting input table, a situation in which a correct sound is produced on key is dramatized. More specifically, the game screen 100 showing a situation in which the player object produces a sound at a correct timing is displayed on the LCD 12, and a correct sound on a correct key is output from the speakers 36*a*, 36*b*.

Furthermore, in a case that the player performs an input at the second zone within the checking zone, and the actual input kind is the same as the set input kind, a situation in which the player object produces a tone being higher or lower in pitch by a semitone is dramatized. More specifically, a game screen 100 showing a situation in which the player character produces a sound at a correct timing is displayed on the LCD 12, and a correct sound on a tone (#,) being higher or lower in pitch by a semitone is output from the speakers 36*a*, 36*b*.

However, in a case that the player performs an input in the checking zone, but the actual input kind is different from the set input kind, a sound corresponding to the input by the player is produced, and a situation showing that the input kind is mistaken (fails) is dramatized. In such a case, although illustration is omitted, a game screen 100 in which the non player objects 104, 106 give the player object 108 a glare as described above is displayed on the LCD 12, and a sound corresponding to the input by the player is output from the speakers 36*a*, 36*b*.

Furthermore, in a case that the actual input timing of the player is before and after the checking zone, even if the actual input kind is coincident with the set input kind, a situation showing that the input kind fails is dramatized. More specifically, the game screen 100 in which the player object 108 produces a sound at the actual input timing by the player is displayed on the LCD 12, and a tone being higher or lower in pitch by a quarter tone from the correct sound, a horrible sound such as a dissonance are output from the speakers 36*a*, 36*b*. Thereafter, a game screen 100 in which the non player objects 104, 106 give the player object 108 a glare is displayed on the LCD 12.

In addition, in a case that the player does not make an input within the checking zone (loses the timing), a no-input situation is dramatized. More specifically, since there is no input from the player, a game screen 100 in which the player object 108 (non player objects 104, 106) does not produce a voice is displayed on the LCD 12, and a tone corresponding to the voice of the player object 108 is not output from the speakers 36*a*, 36*b*. Then, a game screen 100 in which the non player objects 104, 106 give the player object 108 a glare is displayed on the LCD 12.

Thus, a situation when an input by the player is successful and a situation when an input by the player is unsuccessful are illustrated, but these are not limited thereto, and another situation may be adopted. For example, if the player fails to input, different situations may be made between when the timing of producing a sound is fast and when the timing of producing a sound is late. Furthermore, in a case that the player fails to input, a game screen 100 in which the non player objects 104, 106 give the player object 108 a glare is displayed on the LCD 12, but a game screen 100 in which the non player object 102 as a conductor gets angry with the player object 108 may be displayed.

Figure 7:
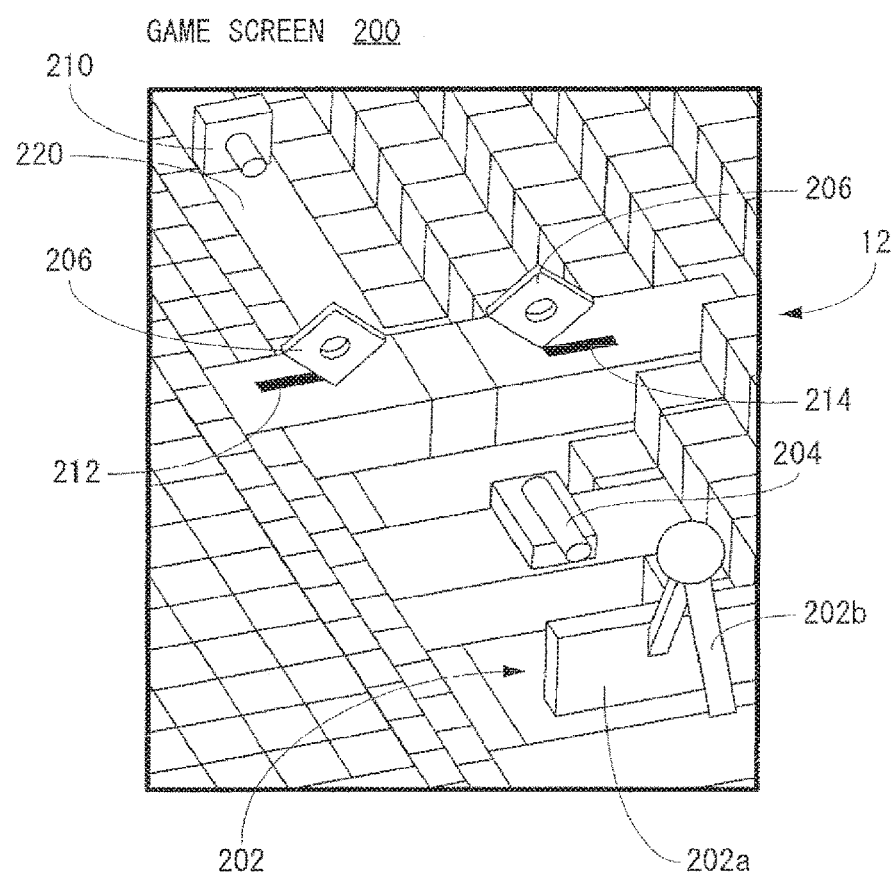
FIG. 7 is an illustrative view showing an example of a game screen of another virtual game.

FIG. 7 shows an example of a game screen 200 of another virtual game. On the game screen 200, a player object 202 like a batting machine, a non player object 204 like a stake, and a non player object 206 of a plate with a through hole on its center are displayed. For example, in this another virtual game, the two non player objects 206 are rotated to the playing of the music from both of the sides of the game screen such that they are overlapped with each other at a predetermined timing (the number of ticks) at the approximately center of the screen.

The player inputs an instruction for batting at a timing when the two non player objects 206 are overlapped by viewing the game screen 200, and listening to the music. In this embodiment, the player performs a flipping operation on the touch panel 24 with the stick 26, or the like. In response thereto, an arm 202*b* of the non player object 202 moves to thereby move a batting portion 202*a* connected thereto so as to hit the non player object 204. Then, the non player object 204 moves in a longitudinal direction, that is, in a left angularly upward direction in response to the hitting.

In this another virtual game, when an input is successful, the non player object 204 is hit by the player object 202, and the non player object 204 pierces the two non player objects 206 such that it penetrates into the two non player objects 206 which are overlapped with each other at the approximately center of the screen. Thus, a non player object 210 which is integrally formed with the non player object 204 and the two non player objects 206 is generated, and the generated non player object 210 moves toward a left angularly upward direction of the screen on a non player object 220 such as a conveyor belt.

Here, whether an input by the player is successful or unsuccessful is determined on the basis of the checking zone shown in FIG. 6. In a case that the actual input timing by the player falls in the first zone out of the checking zone, and the actual input kind is the same as the set input kind, the input is successful and the non player object 210 is generated as described above.

Alternatively, in a case that the actual input timing by the player falls in the second zone out of the checking zone, and the actual input kind is the same as the set input kind, the input is successful, and the non player object 204 is hit by the player object 202, but the non player object 204 collides with the two non player objects 206 to cause the two non player objects 206 randomly fall, so that only the non player object 204 is conveyed on the conveyor belt 220.

Furthermore, in a case that the actual input timing of the player is before the checking zone, and the actual input kind are coincident with the set input kind, the input is unsuccessful, and the non player object 204 is hit by the player object 202 at the actual input timing, but the non player object 204 is conveyed on the conveyor belt 200 as it is without being collided with the two non player objects 206. Additionally, at this time, the two non player objects 206 further rotate and fall into the hole 212 and hole 214 as it is.

Here, in a case that the player does not make any input in the checking zone (including a case that there is an input after the checking zone), the input is unsuccessful, and the non player object 204 is not hit by the player object 202 and thus stays the same as it was while the two non player objects 206 rotate and fall into the holes 212, 214 as it is.

Alternatively, in a case that the actual input timing by the player is within the checking zone, but the actual input kind is not coincident with the set input kind, the input is unsuccessful, and the player object 202 is not operated, and the non player object 204 is not hit by the player object 202. In this case also, the non player object 204 stays the same as it was, and the two non player objects 206 rotate and fall into the holes 212, 214 as it is.

Figure 8:
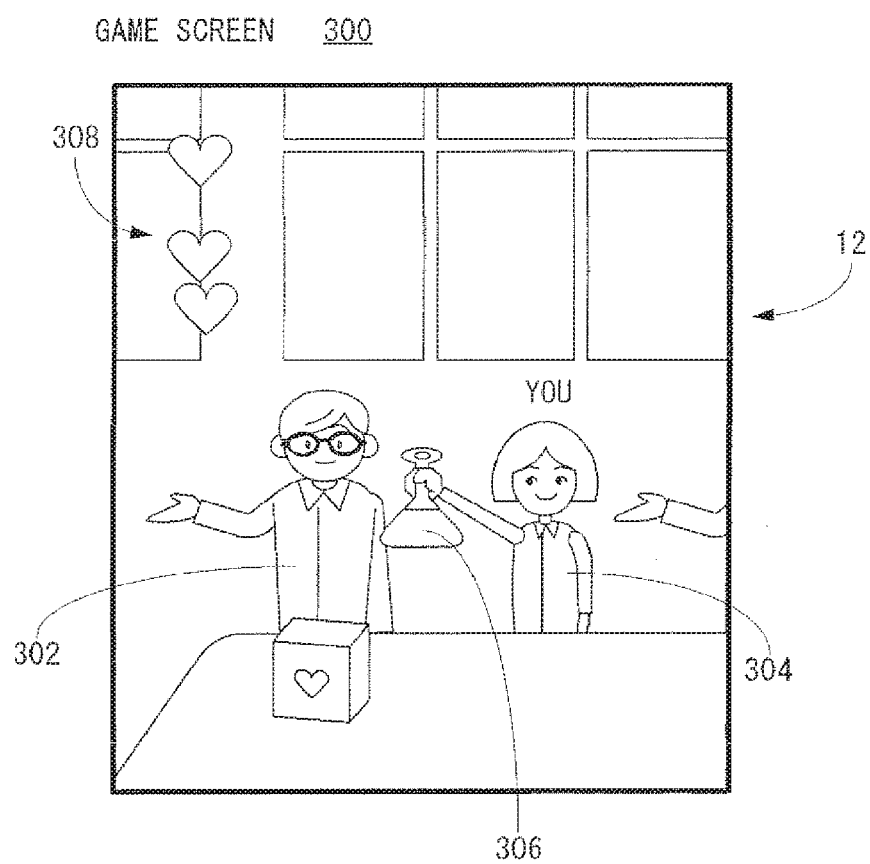
FIG. 8 is an illustrative view showing an example of a game screen of a still another virtual game.

FIG. 8 shows an example of a game screen 300 of a still another virtual game. On the game screen 300, a male non player object 302, a female player object 304, and a non player object 306 of instilment such as a frasco are displayed, and an indicator 308 represented by three heart marks is displayed.

In this still another virtual game, the non player object 306 flies from the left of the non player object 302. The non player object 302 catches the non player object 306, swung it predetermined number of times, and then throws it to the player object 304 (on a right side). If the player object 304 performs a motion the same as that of the non player object 302 according to an operation by the player, a heart is produced, and the hart shape of the indicator 308 is painted out. However, in a case that the player object 304 fails to catch the non player object 306, fails to swing the non player object 306, or fails to throw the non player object 306, a heart is never produced. Accordingly, the hart shape of the indicator 308 is not painted out.

It should be noted that in the actual virtual game, when the heart shape of the indicator 308 is painted out within a limitation, the player object 304 succeeds in love, and when there is a part that is not painted out in the heart shape of the indicator 308, the player object 304 fails in love.

In a case that the player makes the player object 304 catch the non player object 306, a touch-on operation is performed on the touch panel 24 with the stick 26, or the like. Furthermore, in a case that the player makes the player object 304 swing the non player object 306, a rubbing operation is performed on the touch panel 24 with the stick 26, or the like. In a case that the player makes the player object 304 throw the non player object 306, a flipping operation is performed on the touch panel 24 with the stick 26, or the like.

In a case that all these inputs are successful, a heart is produced as described above, but any one of the inputs fails (including a case that the input timing is missed), a heart is not produced. Although the detailed description is omitted, a determination of an input by the player is performed according to the respective checking zones with respect to each of the inputs as described above as shown in FIG. 6. Here, in this still another virtual game, it is required to be successful as to the three kinds of inputs, but when the first input (touch on), that is, catching the non player object 306 fails, a game screen 300 in which a heart is not produced is displayed on the LCD 12 without the rubbing operation and the touch-off operation being determined thereafter. Furthermore, similarly, if the second input (rubbing operation), that is, swinging the non player object 306 fails, the flipping operation to be performed thereafter is not determined.

Figure 9:
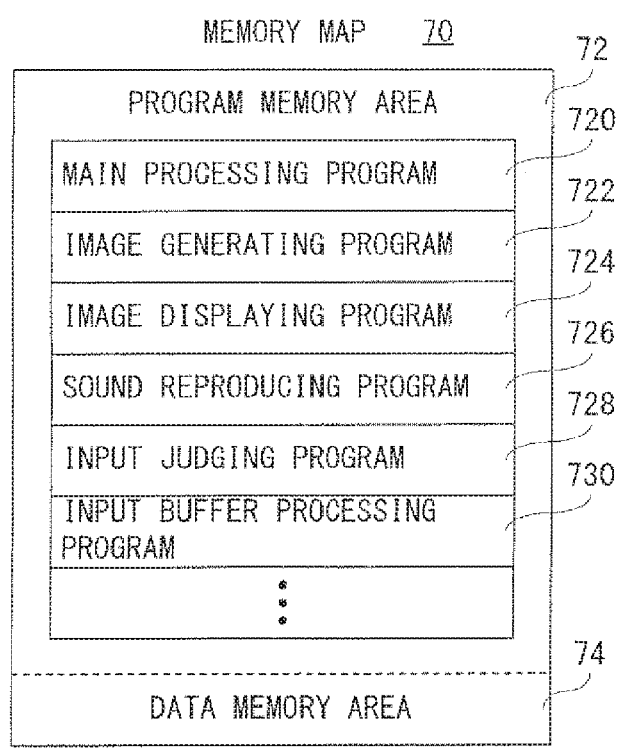
FIG. 9 is an illustrative view showing one example of a memory map of a RAM shown in FIG. 2.

FIG. 9 is an illustrative view showing one example of a memory map 70 of the RAM 42 shown in FIG. 2. As shown in FIG. 9, the RAM 42 includes a program memory area 72 and a data memory area 74. In the program memory area 72, a game program (information processing program) is stored, and the game program is made up with a main processing program 720, an image generating program 722, an image displaying program 724, a sound reproducing program 726, an input judging program 728, an input buffer processing program 730, etc.

The main processing program 720 is a program for processing a main routine of the virtual game of this embodiment. The image generating program 722 is a program for generating a game image corresponding to a game screen (100, 200, 300, etc.) to be displayed on the LCD 12 (14) by utilizing image data 742 to he described later. The image displaying program 724 is a program for displaying a game image generated according to the image generating program 722 on the LCD 12 (14).

The sound reproducing program 726 is a program for reproducing a sound (sound effect, voice, onomatopoeic sound) generated or produced by the player object (108, 202, 304, etc.) and the non player object (104, 106, 204, 206, 210, 302, 306, etc.), or a sound or music to instruct or teach the player when the input timing is by utilizing sound data 744 described later. The sound or music reproduced according to the sound reproducing program 726 is output from the speakers 36a, 36b.

The input judging program 728 is a program for judging whether an input is successful or unsuccessful on the basis of an actual input timing and an actual input kind by the player. Here, the actual input kind by the player is determined (decided) according to the input buffer processing program 730 to be described next, and the determination result is stored in an input buffer 740.

The input buffer processing program 730 is a program for detecting coordinate data (input coordinate data) from the touch panel 24 and storing the same in the input buffer 740. Here, in this embodiment, during one frame period (frame: screen updating unit time (1/60 seconds)), the input coordinate data is detected at four times. Furthermore, the input buffer processing program 730 determines an input kind of the player on the basis of a history of the input coordinate data stored in the input buffer 740, and stores (adds) the number of ticks (the number of current ticks indicated by the current tick count data 752) when the input is made as the number of input ticks together with the determination result in the input buffer 740.

Although illustration is omitted, the game program includes a score accumulating program, a backup program, etc. The score accumulating program adds and subtracts a point (score) in accordance with a success or a failure of an input by the player, and further calculates a game level of the player object or the player. The backup program is a program for storing (saving) game data (proceeding data, result data) on the virtual game of this embodiment in the RAM 28b of the memory card 28.

FIG. 10(A) is an illustrative view showing detailed contents of the data memory area 74 shown in FIG. 9. As shown in FIG. 10(A), the data memory area 74 is provided with the input buffer 740. The input buffer 740 stores data for the determined actual input kind (touch-on operation, touch-off operation, flipping operation, rubbing operation) and data for the number of input ticks as well as input coordinate data.

Furthermore, the data memory area 74 stores image data 742, sound data 744, setting input table data 746, checking zone data 748, current timing data 750, current tick count data 752, currently-touched position data 754, previously-touched position data 756, and movement amount data 758. In addition, the data memory area 74 is provided with a timing counter 760, a touch flag 762, a rub detecting flag 764, etc.

The image data 742 is image data for generating a game image, such as polygon data, texture data, etc. The sound data 744 is data (MIDI data, for example) for a sound (sound effect, voice, onomatopoeic sound) generated or produced by the player object (108, 202, 304, etc.) and the non player object (104, 106, 204, 206, 210, 302, 306, etc.), or music to instruct or teach the player when the input timing is.

The setting input table data 746 is data of the table in which a set input timing (the number of ticks) and a set input kind (action kind) in the set input timing are set in advance. Hereafter, the set input timing and the set input kind may collectively be called "set input information". More specifically, in the setting input table, as shown in FIG. 10(B), set input information, that is, the number of ticks indicating the set input timing and an action kind indicating the set input kind are described in correspondence with the ID (serial number). Here, the number of ticks is the number of ticks from the start of reproducing the music. For example, according to FIG. 10(B), if the ID is "1", a touch-on operation as an input kind at a timing when the number of ticks is "480" is taught or evaluated. If the ID is "2", a touch-off operation as an input kind at a timing when the number of ticks is "960" is taught and evaluated.

The setting input table shown in FIG. 10(B) is merely one example, and different setting input tables are prepared depending on the kind of a virtual game and the kind of music data to be reproduced.

Returning to FIG. 10(A), the checking zone data 748 is data for defining the checking zone shown in FIG. 6. More specifically, the zone of the number of ticks of ±α of the set input timing corresponding to the ID indicated by the current timing data in the setting input table 750 is set as a checking zone. Accordingly, as to the checking zone data 748, data regarding the number of ticks of −α of the set input timing as the number of ticks for starting the checking zone, and data regarding the number of ticks of ±α of the set input timing as the number of ticks for ending the checking zone is stored. Thus, when the ID indicating the current timing data 750 is updated, that is, the set input information to be determined is updated, the checking zone data 748 is also updated.

The current timing data 750 is data for judging which set input information out of the set input information described in the setting input table is an object to be compared, and specifically, is data for the set input information (set input timing and set input kind) being an object to be compared. The current tick count data 752 is data for indicating the number of current ticks, and updated with the passage of time from the start of reproducing the music.

The currently-touched position data 754 is the latest input coordinate data out of the coordinate data input from the touch panel 24, that is, input coordinate data corresponding to the current touched position. The currently-touched position data 754 is a copy of the latest input coordinate data out of the input coordinate data stored in the input buffer 740, and updated every time that input coordinate data is input to the input buffer 740.

The previously-touched position data 756 is input coordinate data stored in the input buffer 740 immediately before the currently-touched position data 754, that is, is input coordinate data corresponding to the previously touched position. The previously-touched position data 756 is updated, when the currently-touched position data 754 is updated, in accordance with the copy of the currently-touched position data 754 being stored as previously-touched position data 756.

The movement amount data 758 is data for a difference (distance) between the previously touched position indicated by the previously-touched position data 756 and the currently touched position indicated by the currently-touched position data 754. Here, the difference or the distance is the absolute value.

The timing counter 760 is a counter for counting an ID of the set input information stored in the setting input table. That is, the ID of the setting input table is sequentially counted from one.

The touch flag 762 is a flag indicating a touched state (touch-on state, touch-off state), and constructed of a register of one bit. When the touch flag 762 is turned on (established), a data value "1" is set to the register, and when the touch flag 762 is turned off (not established), a data value of "0" is set to the register. Here, the touch flag 762 is turned on when the touch state is changed from a touch-off state to a touch-on state. On the other hand, the touch flag 762 is turned off when the touch state is changed from the touch-on state to the touch-off state.

The rub detecting flag 764 is a flag to determine whether or not a rubbing operation is detectable. The rub detecting flag 764 is also constructed of a register of one bit. When the rub detecting flag 764 is turned on, a data value "1" is set to the register, and when the rub detecting flag 764 is turned off, a data value "0" is set to the register. However, the rub detecting flag 764 is turned on when the amount of the movement (difference) indicated by the movement amount data 758 is less than a predetermined value A, and it is turned off when the amount of the movement indicated by the movement amount data 758 is equal to or more than the predetermined value A.

Although illustration is omitted, the data memory area 74 stores other data necessary for executing a game program, and is provided with other counters and other flags necessary for executing a game program.

Figure 11:
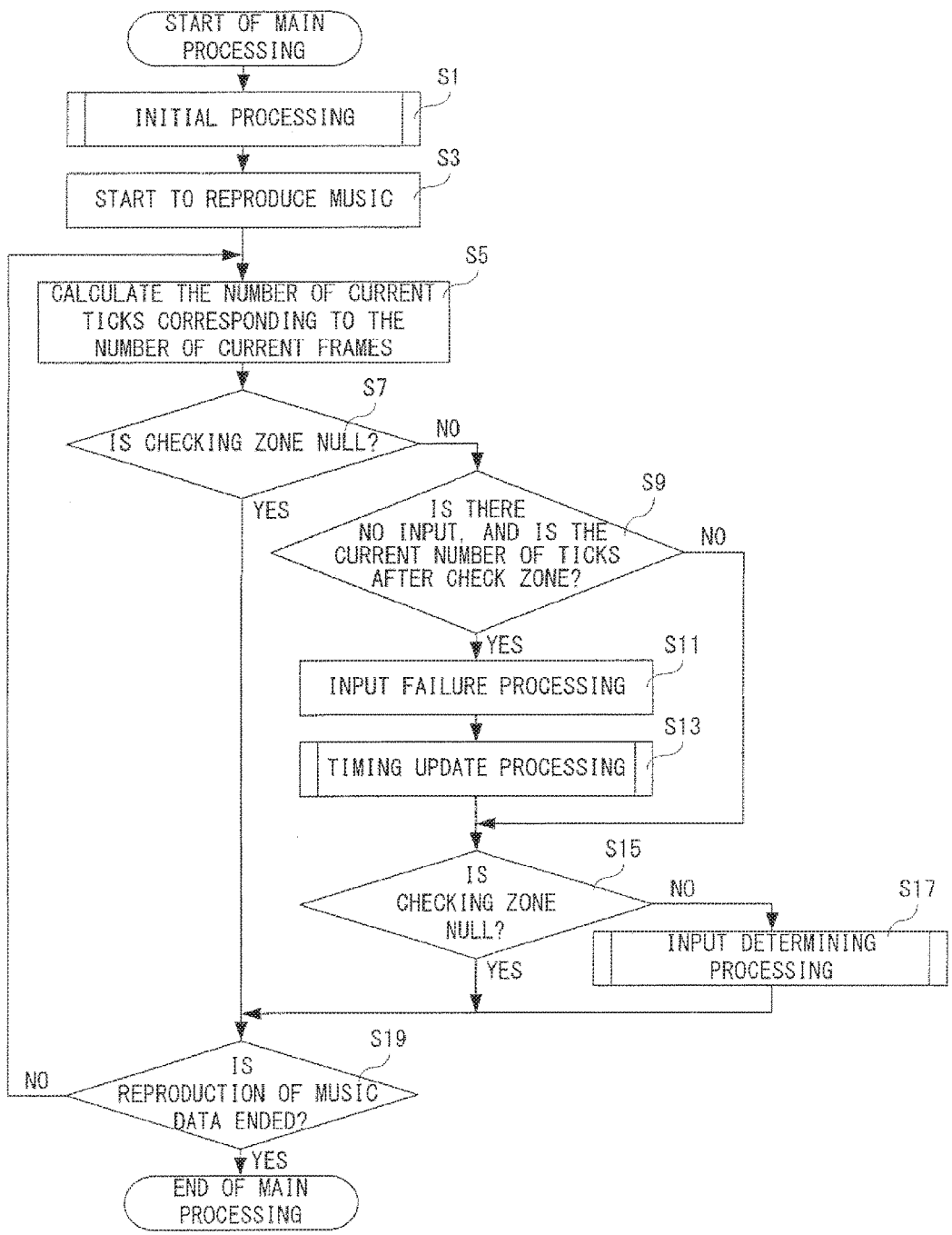
FIG. 11 is a flowchart showing a main processing of a CPU core shown in FIG. 2.

FIG. 11 is a flowchart of main processing of the CPU core 34 shown in FIG. 2. As shown in FIG. 11, when starting the main processing, the CPU core 34 executes initial processing (see FIG. 12) described later in a step S1, and starts to reproduce the music in a next step S3. That is, the data for the music included in the sound data 744 is reproduced, and the reproduced music is output from the speakers 36a, 36b. At the same time or approximately the same time as the music starts to be reproduced, the CPU core 34 starts buffer processing (see FIG. 15) executed in another task.

Although illustration is omitted, while reproducing the music is started, generating the game image are started to display a game screen (100, 200, 300, etc.) on the LCD 12. Furthermore, the game screen (100, 200, 300, etc.) is updated for each frame.

In a step S5, the number of current ticks (current tick count data 752) corresponding to the number of current frames is calculated. That is, the time equivalent to the number of frames from the start of reproducing the music is converted to the number of ticks. Then, in a step S7, it is determined whether or not the checking zone is NULL. Here, it is determined whether or not the determination as to all the set input information described in the setting input table is ended.

If "YES" is determined in the step S7, that is, if the checking zone is NULL, it is determined that there is no set input information to be judged and the process proceeds to a step S19 as it is. On the other hand, if "NO" in the step S7, that is, if the checking zone is not NULL, it is determined that there is set input information to be judged, and in a step S9, it is determined whether or not there is no input and the number of current ticks indicated by the current tick count data 752 is after the checking zone. That is, it is determined whether or not the player misses an input timing.

If "NO" in the step S9, that is, if the number of current ticks is not after the checking zone, the process proceeds to a step S15 as it is. On the other hand, if "YES" is determined in the step S9, that is, if there is no input, and the number of current ticks is after the checking zone, input failure processing is executed in a step S11, timing update processing described later (see FIG. 13) is executed in a step S13, and then, the process proceeds to the step S15. It should be noted that the input failure processing in the step S11 is failure processing in a case of being after the checking zone without performing any input, in which a different situation is produced for each virtual game as described above.

In the step S15, it is determined whether or not the checking zone is NULL. Here, the reason why the process the same as that in the step S7 is executed is that the determination processing as to all the set input information described in the setting input table has already been completed by the processing in the steps S9 to S13, so that NULL may be assigned to the checking zone by the timing update processing. If "YES" is determined in the step S15, that is, if the checking zone is NULL, the process proceeds to the step S19 as it is. On the other hand, if "NO" in the step S15, that is, if the checking zone is not NULL, input determining processing (see FIG. 14) described later is executed in a step S17, and then, the process proceeds to the step S19.

In the step S19, it is determined whether or not the reproduction of the music is to be ended. If "NO" in the step S19, that is, if the reproduction of the music is not to be ended, the process directly returns to the step S5 to continue the virtual game. On the other hand, if "YES" is determined in the step S19, that is, if the reproduction of the music is to be ended, it is determined that the virtual game is to be ended to thereby end the main processing.

It should be noted that a scan time of the main processing shown in FIG. 11 is one frame. Although illustration is omitted, in the main processing, when "YES" is determined in the step S19 to end the main processing, the task of the input buffer processing is also ended.

Figure 12:
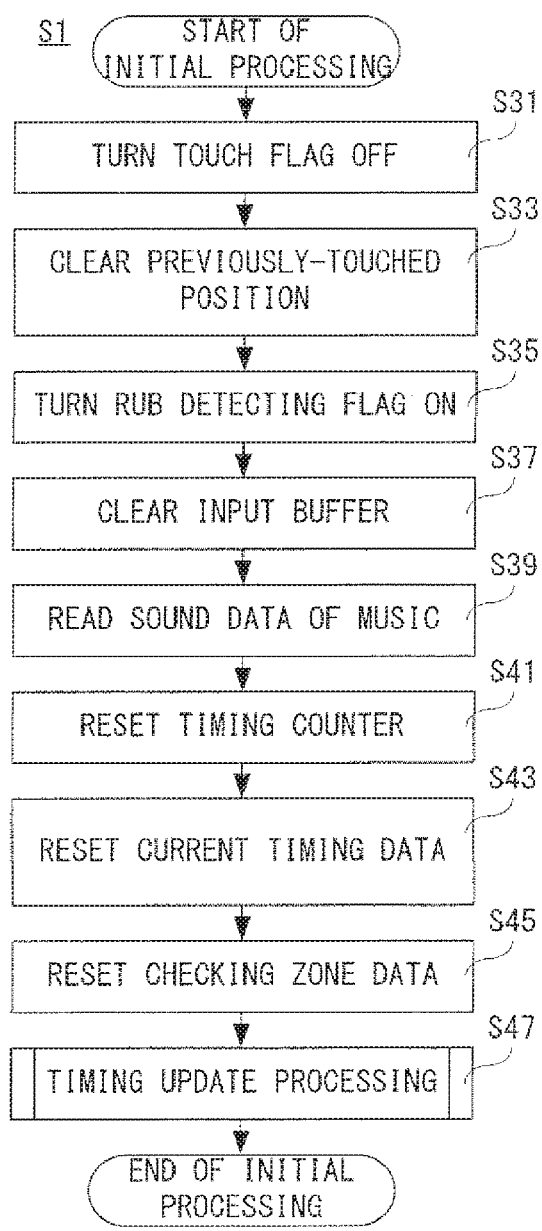
FIG. 12 is a flowchart showing initializing processing of the CPU core shown in FIG. 2.

FIG. 12 is a flowchart showing the initial processing in the step S1 shown in FIG. 11. As shown in FIG. 12, when the initial processing is started, the touch flag 762 is turned off in a step S31, and the previously touched position is cleared in a step S33. That is, in the step S33, NULL is written as a previously-touched position data 756.

Succeedingly, the rub detecting flag 764 is turned on in a step S35, the input buffer 740 is cleared in a step S37, the sound data 744 for the music is read in a step S39, and the timing counter 760 is reset in a step S41. Here, the count value of the timing counter 760 is set to the initial value of "0".

Next, the current timing data 750 is reset in a step S43, the checking zone data 748 is reset in a step S45, and the timing update processing described later is executed in a step S47, and then, the initial processing is ended. For example, in the step S43, NULL is set as the current timing data 750, and in the step S45, NULL is set as the checking zone data 748.

Figure 13:
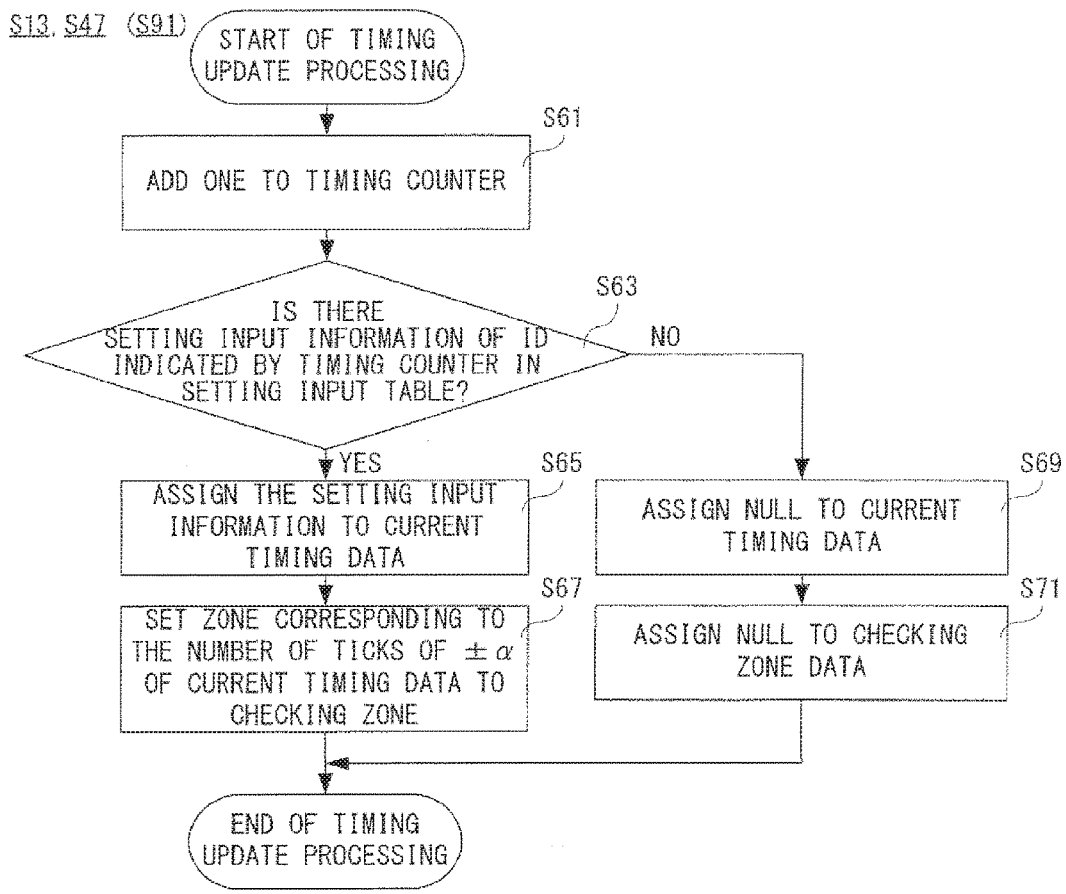
FIG. 13 is a flowchart showing timing updating processing of the CPU core shown in FIG. 2.

FIG. 13 is a flowchart of the timing update processing in the step S13 shown in FIG. 11 and the step S47 shown in FIG. 12. As shown in FIG. 13, when starting the timing update processing, the CPU core 34 adds one to the timing counter 760 in a step S61. Next, in a step S63, it is determined whether or not there is the set input information of the ID indicated by the count value of the timing counter 760 in the setting input table. That is, it is determined whether or not there is the set input information to be judged.

If "YES" is determined in the step S63, that is, if there is the set input information of the ID indicated by the count value of the timing counter 760 in the setting input table, that is, if there is the set input information to be judged, the set input information is assigned to the current timing data 750 in a step S65. That is, in the step S65, the data for the set input timing and the set input kind that are indicated by the set input information is set as the current timing data 750. In a step S67, the zone corresponding to the number of ticks of ±a indicated by the current timing data 750 (the set input timing) is set as a checking zone, and the timing update processing is ended. That is, in the step S67, the checking zone data 748 regarding the number of ticks of the set input timing of −α as a start of the checking zone and the number of ticks of the set input timing ±α as an end of the checking zone is set.

On the other hand, if "NO" in the step S63, that is, if there is no set input information of the ID indicated by the count value of the timing counter 760 in the setting input table, that is, if there is no set input information to be judged, NULL is assigned to the current timing data 750 in a step S69, NULL is assigned to the checking zone data 748 in a step S71, and then, the timing update processing is ended.

Figure 14:
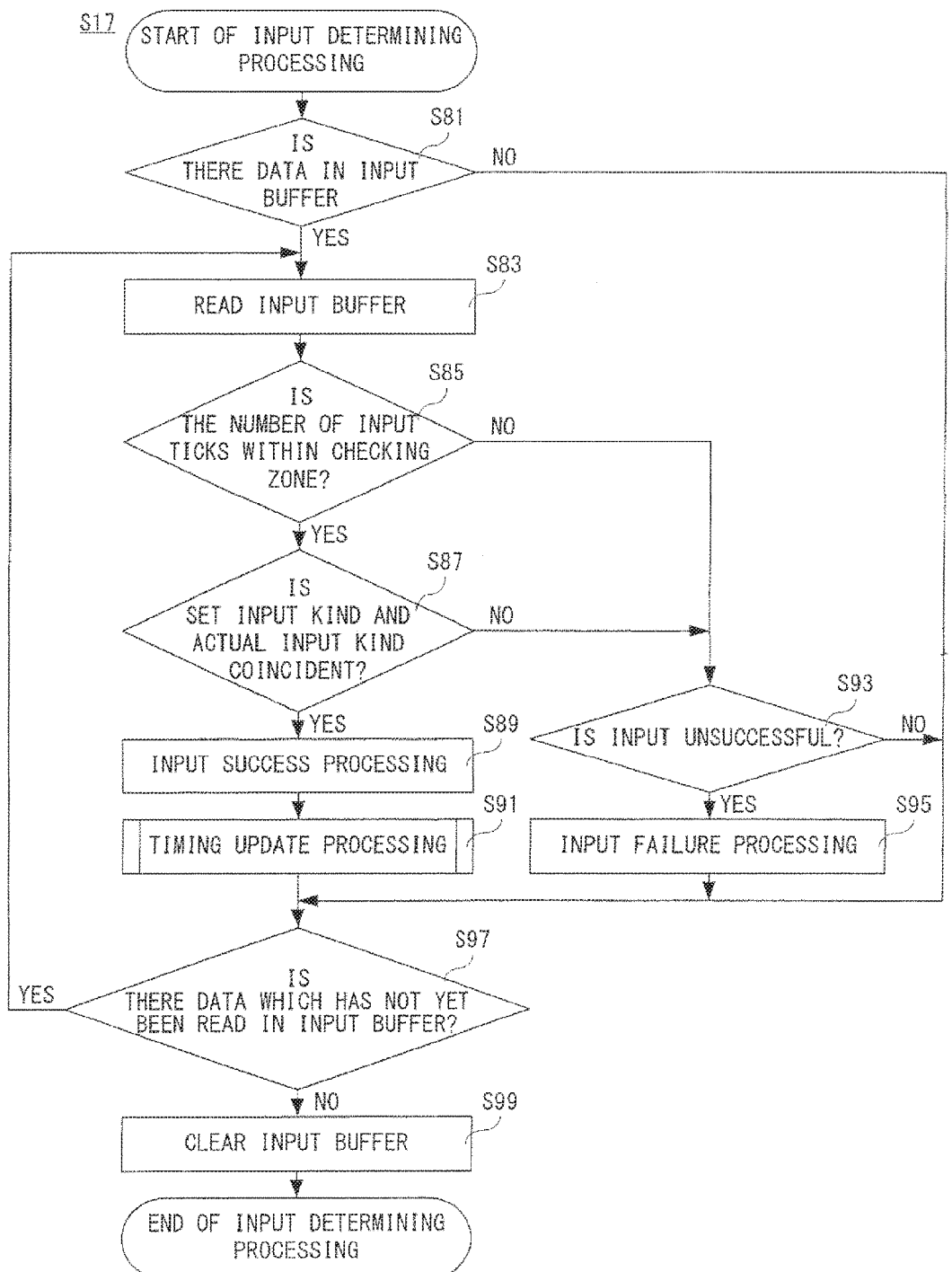
FIG. 14 is a flowchart showing an input determining processing of the CPU core shown in FIG. 2.

FIG. 14 is a flowchart of the input determining processing in the step S17 shown in FIG. 11. As shown in FIG. 14, when starting the input determining processing, the CPU core 34 determines whether or not there is data (input coordinate data) in the input buffer 740 in a step S81. If "NO" in the step S81, that is, if there is no data in the input buffer 740, the process proceeds to a step S97 as it is. On the other hand, if "YES" is determined in the step S81, that is, if there is data in the input buffer 740, the input buffer 740 is read in a step S83, and it is determined whether or not the number of input ticks indicated by the data for the number of input ticks stored together with the data for actual input kind falls within the checking zone indicated by the checking zone data 748 in a step S85.

If "NO" in the step S85, that is, if the number of input ticks does not fall within the checking zone indicated by the checking zone data 748, the process proceeds to a step S93. On the other hand, if "YES" is determined in the step S85, that is, if the number of input ticks falls within the checking zone indicated by the checking zone data 748, it is determined whether or not the set input kind indicated by the current timing data 750 and the actual input kind stored in the input buffer 740 together with the number of input ticks are coincident with each other in a step S87.

If "NO" in the step S87, that is, if the set input kind indicated by the current timing data 750 and the actual input kind stored in the input buffer 740 together with the number of input ticks are not coincident with each other, the process proceeds to the step S93. On the other hand, if "YES" is determined in the step S87, that is, if the set input kind indicated by the current timing data 750 and the actual input kind stored in the input buffer 740 together with the number of input ticks are coincident with each other, input success processing is executed in a step S89, the timing update processing explained by utilizing the flowchart shown in FIG. 13 is executed in a step S81, and then, the process proceeds to a step S97.

In the step S93, it is determined whether or not the input is unsuccessful. For example, an input by the player is performed out of the checking zone, so that it may be determined that the input is unsuccessful due to losing the timing, or an input by player is performed within the checking zone, but it may be determined that the input is unsuccessful due to an error of the input kind. However, in a case of the virtual game explained by utilizing the game screen 300 shown in FIG. 8, if the successive three inputs have to be made successful, when the first or the second input is unsuccessful, a subsequent input is neglected or is made ineffective, and therefore, in the step S93, it is determined whether or not the input is unsuccessful, and if the input is neglected or is made ineffective, "NO" is determined in the step S93. Furthermore, for example, even in a case of playing the game in which only a flipping operation is regarded as an input, a touch-on operation is sure to be detected before a flipping operation. Accordingly, in a case of playing the game in which only the flipping operation is regarded as an input, a touch-on input is neglected or is made effective, and in such a case also, "NO" is determined in the step S93. Similarly, in a case of playing the game in which only a touch-on operation (or touch-off operation) is regarded as an input, an input of a touch-off operation (or touch-on operation) detected before it is neglected or is made effective.

If "NO" in the step S93, that is, if the input is not unsuccessful, but is neglected or made ineffective, the process proceeds to the step S97. On the other hand, if "YES" is determined in the step S93, that is, if the input is unsuccessful, the input failure processing is executed in a step S95, and the process proceeds to the step S97. Here, the input failure processing in the step S95 is the failure processing in a case that the input is out of the checking zone, or in a case that the input is within the checking zone, but the input kind is mistaken, and a different situation is produced therein for each virtual game as described above.

In the step S97, it is determined whether or not there is data which has not yet been read in the input buffer 740. That is, the CPU 34 determines whether or not there is data which has not been subjected to an input determination within the input buffer 740. If "YES" is determined in the step S97, that is, if there is data which has not yet been read in the input buffer 740, the process returns to the step S83 in order to perform an input determination of the data which has not been read. On the other hand, if "NO" in the step S97, that is, if there is no data which has not yet been read in the input buffer 740, it is determined that the input determination has been performed on all the data within the input buffer 740, the input buffer 740 is cleared (erased) in a step S99, and the input determining processing is ended.

Figure 15:
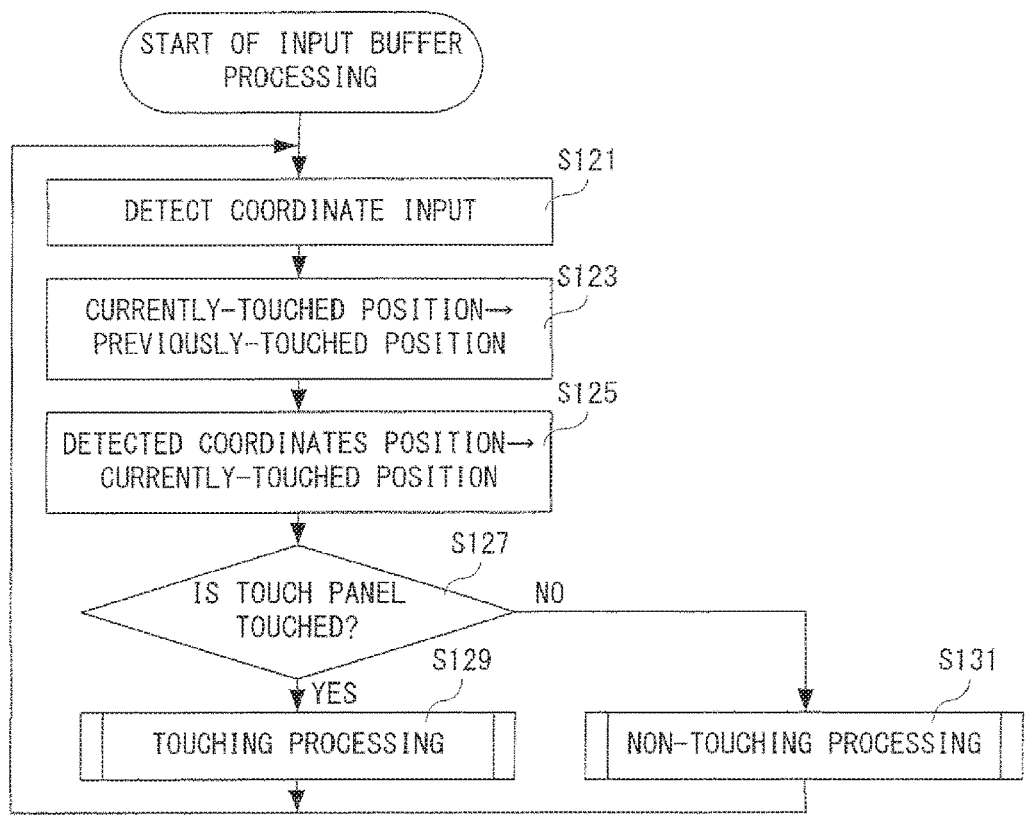
FIG. 15 is a flowchart showing input buffer processing of the CPU core shown in FIG. 2.

FIG. 15 is a flowchart of the input buffer processing by the CPU core 34 shown in FIG. 2. As described above, the input buffer processing is executed in another task other than the main processing, and its scan time is one quarter of the main processing (one frame). By the input buffer processing, input coordinates are detected, and an actual input kind is determined.

As shown in FIG. 15, when the input buffer processing is started, an input of the coordinates is detected in a step S121. That is, it is determined whether or not there is input coordinate data from the touch panel 24, and if there is input coordinate data, the input coordinate data is stored in the input buffer 740.

In a succeeding step S123, the currently-touched position is assigned to the previously-touched position. That is, the CPU core 34 stores (updates) a copy of the currently-touched position data 754 as a previously-touched position data 756 in the data memory area 74. Next, in a step S125, the detected coordinate position is assigned to the currently-touched position. That is, the CPU core 34 stores (updates) the latest input coordinate data that is detected at this time and stored in the input buffer 740 in the data memory area 74 as a currently-touched position data 754.

Then, in a step S127, it is determined whether or not the touch panel 24 is touched. That is, in the step S121, it is determined whether or not input coordinate data is detected. If "YES" is determined in the step S127, that is, if the input coordinate data is detected to thereby determine that the touch panel 24 is touched, touching processing (see FIG. 16) described later is executed in a step S129, and then, the process returns to the step S121. On the other hand, if "NO" in the step S127, that is, if the input coordinate data is not detected to thereby determine that the touch panel 24 is not touched, non-touching processing (see FIG. 17) described later is executed in a step S131, and then, the process returns to the step S121.

Figure 16:
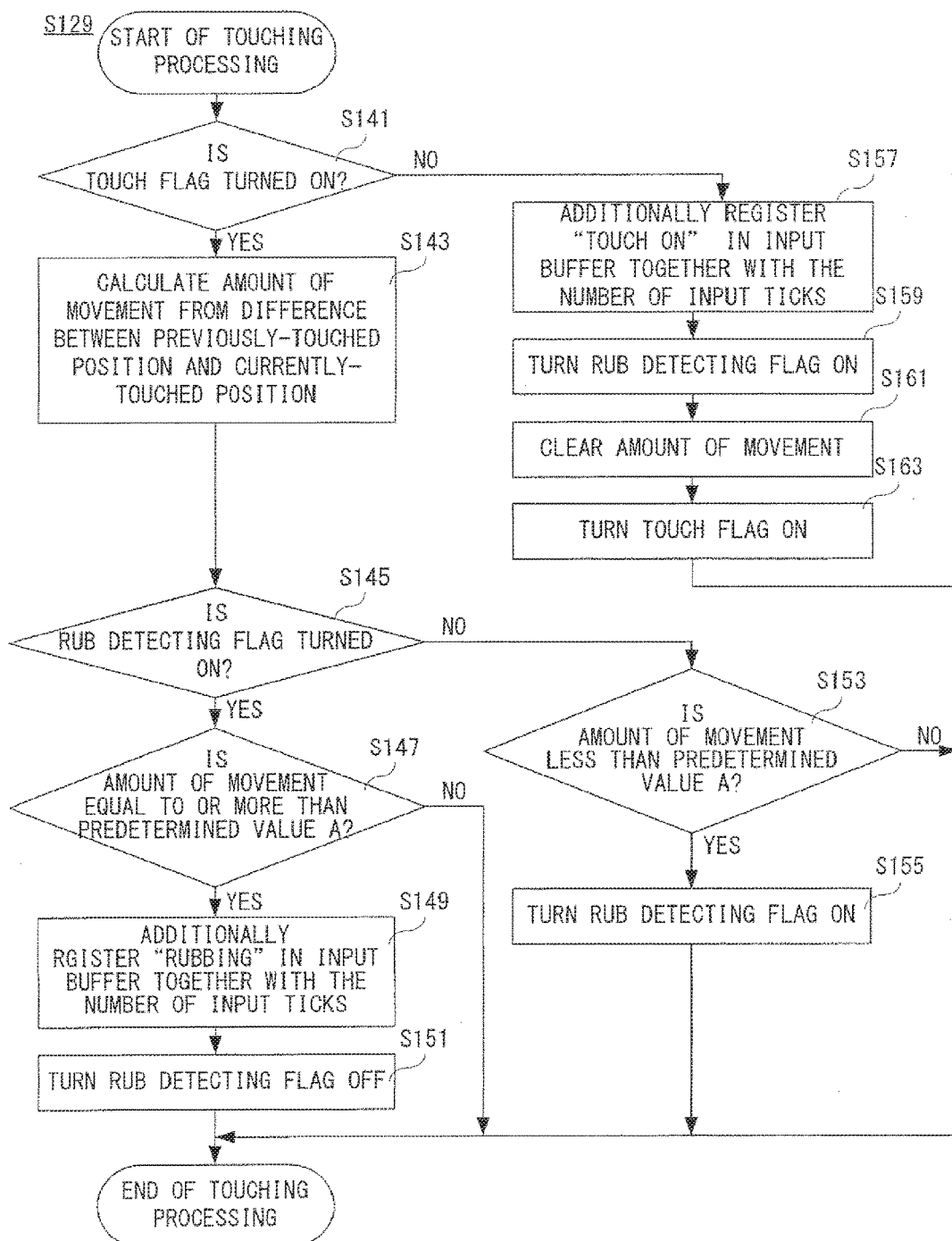
FIG. 16 is a flowchart showing touching processing of the CPU core shown in FIG. 2.

FIG. 16 is a flowchart of the touching processing shown in the step S129 in FIG. 15. As shown in FIG. 16, when starting the touching processing, the CPU core 34 determines whether or not the touch flag 762 is turned on in a step S141. That is, the CPU 34 determines whether or not a touch-on state continues. If "YES" is determined in the step S141, that is, if the touch flag 762 is turned on, it is determined that the touch-on state continues, and an amount of movement is calculated from the difference between the previously-touched position and the currently-touched position in a step S143. That is, the CPU core 34 calculates the movement amount data 758 from the difference between the previously-touched position indicated by the previously-touched position data 756 and the currently-touched position indicated by the currently-touched position data 754. This is applied to the following.

In a succeeding step S145, it is determined whether or not the rub detecting flag 764 is turned on. If "YES" is determined in the step S145, that is, if the rub detecting flag 764 is turned on, it is determined whether or not the amount of movement indicated by the movement amount data 758 is equal to or more than the predetermined value A in a step S147. That is, if the touched-on state continues, and the amount of movement for a certain length of time (¼ frame, here) is equal to or more than the predetermined value A, it is determined that the input speed is above a preset speed to thereby detect start of the rubbing operation. That is, the predetermined value A (preset speed) is a value for detecting the start of a rubbing operation, and empirically obtained by tests, or the like. It should be noted that one going and returning when the player makes sliding operations by repetitively going and returning his or her finger or the like on the touch panel 24 is determined to be a rubbing operation, and therefore, the CPU core 34 determines that one rubbing operation continues until the speed is less than the preset speed ("YES" in the S153) as described later.

If "NO" in the step S147, that is, if the amount of movement indicated by the movement amount data 758 is less than the predetermined value A, it is determined that a rubbing operation is not started or it is not a rubbing operation, and then, the touching processing is ended as it is. That is, the process returns to the input buffer processing shown in FIG. 15. On the other hand, if "YES" is determined in the step S147, that is, if the amount of movement indicated by the movement amount data 758 is equal to or more than the predetermined value A, it is determined that the actual input kind is a rubbing operation, and "rubbing" is additionally registered together with the number of input ticks in the input buffer 740 in a step S149. That is, the data for the number of input ticks and the information on the "rubbing operation" (identification information, etc.) are added to the input coordinate data detected in the step S121 shown in FIG. 15. This is applied to a case that an input kind is additionally registered in input buffer 740. Then, in a step S151, the rub detecting flag 764 is turned off, and the process returns to the input buffer processing.

Alternatively, if "NO" in the step S145, that is, if the rub detecting flag 764 is turned off, it is determined that the rubbing operation is being continued, and it is determined whether or not the amount of movement indicated by the movement amount data 758 is less than the predetermined value A in a step S153. Here, the CPU core 34 determines whether or not one rubbing operation is ended as described above. If "NO" in the step S153, that is, if the amount of movement indicated by the movement amount data 758 is equal to or more than the predetermined value A, it is determined that the rubbing operation continues, and the process returns to the input buffer processing as it is. On the other hand, if "YES" is determined in the step S153, that is, if the amount of movement indicated by the movement amount data 758 is less than the predetermined value A, it is determined that the rubbing operation is ended, and the rub detecting flag 764 is turned on in order to enable a next rubbing operation to be detected in a step S155, and the process returns to the input buffer processing.

Alternatively, if "NO" in the step S141, that is, if the touch flag 762 is turned off, it is determined that the touch-off state shifts to the touch-on state. That is, it is determined that the actual input kind is a touch-on operation. Accordingly, in a step S157, "touch on" is additionally registered in the input buffer 740 together with the number of input ticks. In a next step S159, the rub detecting flag 764 is turned on, in a step S161, the movement amount data 758 is cleared, in a step S163, the touch flag 762 is turned on, and then, the process returns to the input buffer processing. That is, the processing in the steps S159-S163 brings about a state in which a rubbing operation is detectable.

Figure 17:
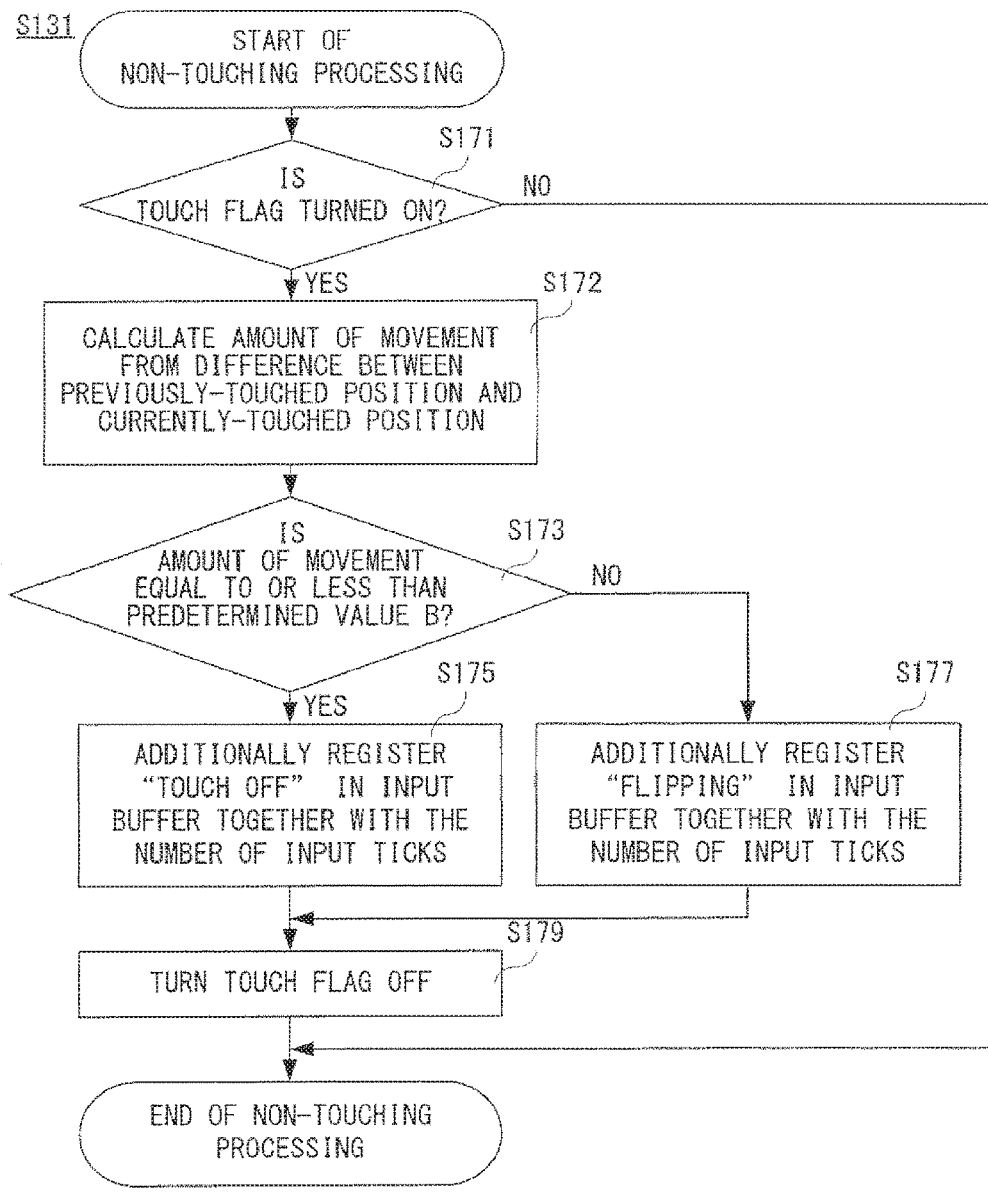
FIG. 17 is a flowchart showing non-touching processing of the CPU core shown in FIG. 2.

FIG. 17 is a flowchart of the non-touching processing in the step S131 shown in FIG. 15. As shown in FIG. 17, when starting the non-touching processing, the CPU core 34 determines whether or not the touch flag 762 is turned on in a step S171. Here, the CPU core 34 determines whether or not the touch-on state shifts to the touch-off state. If "NO" in the step S171, that is, if the touch flag 762 is turned off, it is determined that the touch-off state continues to thereby determine that there is no input, and then, the non-touching processing is ended. That is, the process returns to the input buffer processing shown in FIG. 15.

On the other hand, if "YES" is determined in the step S171, that is, if the touch flag 762 is turned on, it is determined that the touch-on state shifts to the touch-off state, and an amount of movement (movement amount data 758) is calculated from the difference between the previously touched position and the currently-touched position in a step S172. Then, in a step S173, it is determined whether or not the amount of movement indicated by the movement amount data 758 is equal to or less than a predetermined value B. Here, the predetermined value B is a value for determining whether a flipping operation or not, and empirically decided by tests, or the like. For the sake of convenience, the predetermined value A and the predetermined value B are represented by different values, but may be the same value.

If "YES" is determined in the step S173, that is, if the amount of movement indicated by the movement amount data 758 is equal to or less than the predetermined value B, it is determined that the actual input kind is a touch-off operation, and "touch off" is additionally registered in the input buffer 740 along with the number of input ticks in a step S175, the touch flag 762 is turned off in a step S179, and then, the process returns to the input buffer processing. On the other hand, if "NO" in the step S173, that is, if the amount of movement indicated by the movement amount data 758 is above the predetermined value B, it is determined that the actual input kind is a flipping operation, "flipping" is additionally registered in the input buffer together with the number of input ticks in a step S177, and then, the process proceeds to the step S179.

According to this embodiment, a touch-on operation is not only merely made to the music or according the game screen, but also a touch-off operation, a flipping operation, a rubbing operation are made, which allows variety of inputs, and improves interests of the game.

Furthermore, according to this embodiment, since different processing are executed depending on the degree of coincidence between the input timing performed by the player and its input kind and the input timing and the input kind that are set in advance, and this makes it possible to not only weight the timing of the input, but also reflect accuracy of an input through the subsequent processing.

Additionally, although the touch panel is used as a pointing device in this embodiment, other pointing devices, such as a pen tablet, a touch pad, a computer mouse, or the like may be used. Here, in a case that a pen tablet and a computer mouse are employed, a method of determining a touch-on operation, a touch-off operation, a flipping operation and a rubbing operation has to be changed.

Furthermore, the configuration of the game apparatus should not be limited to that of the above-described embodiment. For example, one LCD may be provided, or touch panels may be provided to two LCDs. In addition, a touch panel may be peripheral devices to be connected to the game apparatus.

Although the present embodiment has been described and illustrated in detail, it is clearly understood that the same is by way of illustration and example only and is not to be taken by way of limitation, the spirit and scope of the present embodiment being limited only by the terms of the appended claims.

What is claimed is:

1. A non-transitory computer-readable storage medium storing an information processing program, the information processing program, when executed, causing one or more computer processors of an information processing apparatus configured to receive an input from a touch panel to perform operations comprising:

outputting an advance music and/or an image set indicating an exemplar input kind and an exemplar input timing of an input operation to be made by a user;

storing instructed coordinates received from the touch panel;

determining that an instructed input kind is a multi-movement input, conditioned on the instructed coordinates forming one touch input uninterrupted by a touch-off event that comprises first and second movements separated by a temporal break, the temporal break starting in response to the first movement having a first speed less than or equal to a threshold value greater than zero, the second movement having a second speed greater than or equal to the threshold value, the temporal break ending with second movement starting;

determining that an instructed input timing is a timing of the multi-movement input;

comparing the exemplar input kind and the exemplar input timing with the instructed input kind and the instructed input timing; and executing predetermined processing according to the result of the comparing.

2. The non-transitory computer-readable storage medium of claim 1, wherein a third movement different from the first and second movements occurs during the temporal break.

3. The non-transitory computer-readable storage medium of claim 1, wherein a touch-on event unaccompanied by movement occurs during the temporal break.

4. The non-transitory computer-readable storage medium of claim 1, wherein the first movement and/or second movement correspond(s) to a rubbing operation.

5. The non-transitory computer-readable storage medium of claim 1, wherein:
the comparing includes detecting a degree of coincidence between the exemplar input kind and the exemplar input timing and the instructed input kind and the instructed input timing, and
the predetermined processing depends on the degree of coincidence.

6. An information processing method for use with an information processing apparatus comprising one or more computer processors and a touch panel configured to receive input, the method comprising:
outputting an advance music and/or an image set indicating an exemplar input kind and an exemplar input timing of an input operation to be made by a user;
storing instructed coordinates received from the touch panel;
determining that an instructed input kind is a multi-movement input, conditioned on the instructed coordinates forming one touch input uninterrupted by a touch-off event that comprises first and second movements separated by a temporal break, the temporal break starting in response to the first movement having a first speed less than or equal to a threshold value greater than zero, the second movement having a second speed greater than or equal to the threshold value, the temporal break ending with second movement starting;
determining that an instructed input timing is a timing of the multi-movement input;
comparing the exemplar input kind and the exemplar input timing with the instructed input kind and the instructed input timing; and
executing predetermined processing according to the result of the comparing.

7. The method of claim 6, wherein a third movement different from the first and second movements occurs during the temporal break.

8. The method of claim 6, wherein a touch-on event unaccompanied by movement occurs during the temporal break.

9. The method of claim 6, wherein the first movement and/or second movement correspond(s) to a rubbing operation.

10. The method of claim 6, wherein:
the comparing includes detecting a degree of coincidence between the exemplar input kind and the exemplar input timing and the instructed input kind and the instructed input timing, and
the predetermined processing depends on the degree of coincidence.

11. An information processing system, comprising:
a touch panel configured to receive an input;
one or more computer processors configured to control the information processing system to at least:
output an advance music and/or an image set indicating an exemplar input kind and an exemplar input timing of an input operation to be made by a user;
store instructed coordinates received from the touch panel;
determine that an instructed input kind is a multi-movement input, conditioned on the instructed coordinates forming one touch input uninterrupted by a touch-off event that comprises first and second movements separated by a temporal break, the temporal break starting in response to the first movement having a first speed less than or equal to a threshold value greater than zero, the second movement having a second speed greater than or equal to the threshold value, the temporal break ending with second movement starting;
determine that an instructed input timing is a timing of the multi-movement input;
compare the exemplar input kind and the exemplar input timing with the instructed input kind and the instructed input timing; and
execute predetermined processing according to the result of the comparing.

12. The system of claim 11, wherein a third movement different from the first and second movements occurs during the temporal break.

13. The system of claim 11, wherein a touch-on event unaccompanied by movement occurs during the temporal break.

14. The system of claim 11, wherein the first movement and/or second movement correspond(s) to a rubbing operation.

15. The system of claim 11, wherein:
the comparing includes detecting a degree of coincidence between the exemplar input kind and the exemplar input timing and the instructed input kind and the instructed input timing, and
the predetermined processing depends on the degree of coincidence.

16. An information processing apparatus, comprising:
a touch panel configured to receive an input;
one or more computer processors configured to control the information processing apparatus to at least:
output an advance music and/or an image set indicating an exemplar input kind and an exemplar input timing of an input operation to be made by a user;
store instructed coordinates received from the touch panel;
determine that an instructed input kind is a multi-movement input, conditioned on the instructed coordinates forming one touch input uninterrupted by a touch-off event that comprises first and second movements separated by a temporal break, the temporal break starting in response to the first movement having a first speed less than or equal to a threshold value greater than zero, the second movement having a second speed greater than or equal to the threshold value, the temporal break ending with second movement starting;
determine that an instructed input timing is a timing of the multi-movement input;
compare the exemplar input kind and the exemplar input timing with the instructed input kind and the instructed input timing; and execute predetermined processing according to the result of the comparing.

17. The apparatus of claim 16, wherein a third movement different from the first and second movements occurs during the temporal break.

18. The apparatus of claim 16, wherein a touch-on event unaccompanied by movement occurs during the temporal break.

19. The apparatus of claim 16, wherein the first movement and/or second movement correspond(s) to a rubbing operation.

20. The apparatus of claim 16, wherein:
the comparing includes detecting a degree of coincidence between the exemplar input kind and the exemplar input timing and the instructed input kind and the instructed input timing, and
the predetermined processing depends on the degree of coincidence.

\* \* \* \* \*